(12) United States Patent
Lawrence et al.

(10) Patent No.: US 12,019,625 B2
(45) Date of Patent: *Jun. 25, 2024

(54) TECHNIQUES FOR AUTOMATED DATABASE QUERY GENERATION

(71) Applicant: STATE STREET CORPORATION, Boston, MA (US)

(72) Inventors: Stephen C. Lawrence, Boston, MA (US); Yongwei Ding, Cambridge, MA (US); Junjie Du, Sudbury, MA (US); Ana Baltazar, Boston, MA (US); Pedro Gaspar, Boston, MA (US); Rui Peixe, Boston, MA (US)

(73) Assignee: STATE STREET CORPORATION, Boston, MA (US)

( * ) Notice: Subject to any disclaimer, the term of this patent is extended or adjusted under 35 U.S.C. 154(b) by 18 days.

This patent is subject to a terminal disclaimer.

(21) Appl. No.: 17/373,043

(22) Filed: Jul. 12, 2021

(65) Prior Publication Data

US 2022/0004549 A1 Jan. 6, 2022

Related U.S. Application Data

(63) Continuation of application No. 15/653,164, filed on Jul. 18, 2017, now Pat. No. 11,061,892.
(Continued)

(51) Int. Cl.
*G06F 16/24* (2019.01)
*G06F 3/0482* (2013.01)
(Continued)

(52) U.S. Cl.
CPC ........ *G06F 16/2423* (2019.01); *G06F 3/0482* (2013.01); *G06F 3/0486* (2013.01); *G06F 16/252* (2019.01)

(58) Field of Classification Search
CPC .................................................. G06F 16/2423
See application file for complete search history.

(56) References Cited

U.S. PATENT DOCUMENTS 9,330,167 B1 * 5/2016 Pendar .................. G06F 16/328
9,348,917 B2 * 5/2016 Motoyama ............ G06F 16/951
(Continued)

*Primary Examiner* — Mohammad S Rostami
(74) *Attorney, Agent, or Firm* — GOODWIN PROCTER LLP

(57) ABSTRACT

Various embodiments are generally directed to techniques for automated generation of database queries. Techniques described herein may provide an automated database query generation method and system that provides a graphical user interface with one or more user interface items representing records within a database stored on a non-transitory computer-readable storage medium of a server. The server may receive an input from a graphical user interface, the input selecting one or more of the user interface elements. A processor of the server may configure the display of an indication within the graphical user interface that the one or more of the user interface elements has been selected. The processor of the server may automatically generate one or more queries to the database based upon the received input. The processor of the server may automatically update the configuration of the display of the one or more user interface elements based upon a result of the automatically generated one or more queries to the database.

24 Claims, 24 Drawing Sheets

Related U.S. Application Data

(60) Provisional application No. 62/363,631, filed on Jul. 18, 2016.

(51) Int. Cl.
　　*G06F 3/0486* (2013.01)
　　*G06F 16/242* (2019.01)
　　*G06F 16/25* (2019.01)

(56) References Cited

U.S. PATENT DOCUMENTS

| | | | |
|---|---|---|---|
| 9,578,122 B1* | 2/2017 | Lorenz | H04L 51/063 |
| 9,697,629 B1* | 7/2017 | Vetter | G06T 11/60 |
| 2006/0259475 A1* | 11/2006 | Dehlinger | G06F 16/93 |
| 2009/0265631 A1* | 10/2009 | Sigurbjornsson | G06Q 10/10 |
| | | | 715/716 |
| 2010/0205213 A1* | 8/2010 | Broder | G06Q 30/0251 |
| | | | 711/E12.017 |
| 2011/0022982 A1* | 1/2011 | Takaoka | G06F 3/04883 |
| | | | 715/810 |
| 2011/0196864 A1* | 8/2011 | Mason | G06F 16/48 |
| | | | 707/E17.014 |
| 2011/0316796 A1* | 12/2011 | Kano | G06F 3/0488 |
| | | | 345/173 |
| 2013/0103680 A1* | 4/2013 | Arrasvuori | G06F 16/332 |
| | | | 707/769 |
| 2014/0280169 A1* | 9/2014 | Liu | G10L 15/1815 |
| | | | 707/739 |
| 2014/0317104 A1* | 10/2014 | Isaacs | G06F 16/332 |
| | | | 707/728 |
| 2015/0213095 A1* | 7/2015 | Endou | G06F 16/9032 |
| | | | 707/728 |
| 2016/0063124 A1* | 3/2016 | Lee | G06F 16/9538 |
| | | | 707/731 |
| 2016/0188658 A1* | 6/2016 | Thomson | G06F 3/04883 |
| | | | 707/766 |
| 2016/0378718 A1* | 12/2016 | Jarroush | G06F 40/18 |
| | | | 715/229 |
| 2017/0103103 A1* | 4/2017 | Nixon | G06F 16/2452 |

* cited by examiner

200

- ID 202
- Date Added 204
- Date Published 206
- Type 208
- Author 210
- Title 212
- Abstract 214
- Tags 216

FIG. 2

Logic Flow 400

Logic Flow 600

FIG. 9D

TECHNIQUES FOR AUTOMATED DATABASE QUERY GENERATION

RELATED APPLICATIONS

This application is a continuation of and claims the benefit of priority to U.S. patent application Ser. No. 15/653,164, titled "TECHNIQUES FOR AUTOMATED DATABASE QUERY GENERATION," filed on Jul. 18, 2017, which claims priority to U.S. Provisional Patent Application No. 62/363,631, filed Jul. 18, 2016, which are hereby incorporated by reference in their entireties.

BACKGROUND

Databases are commonly used to store large amounts of data for a variety of purposes. Databases may store records for websites, research, or e-commerce, for example. Databases may allow users to submit queries in one or more database languages, such as PostgreSQL or MySQL, as two examples. If a user has knowledge of the contents of a database and the syntax for performing queries, they may be able to search for and access relevant database records. However, users may not be familiar with the syntax required to submit database queries. Further, users may not know what information is contained within a database, the amount of information available with respect to a particular topic, or how submitted queries impact the relevant information available within a database. Accordingly, improved techniques for visualizing the content of databases, and generating queries for databases are desirable.

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Techniques described herein may provide an automated database query generation method and system that provides a graphical user interface with one or more user interface items representing records within a database stored on a non-transitory computer-readable storage medium of a server. The server may receive an input from a graphical user interface, the input selecting one or more of the user interface elements. A processor of the server may configure the display of an indication within the graphical user interface that the one or more of the user interface elements has been selected. The processor of the server may automatically generate one or more queries to the database based upon the received input. The processor of the server may automatically update the configuration of the display of the one or more user interface elements based upon a result of the automatically generated one or more queries to the database.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 2 illustrates an embodiment of a data record.
FIGS. 9A-9D illustrate a user interface according to an embodiment.

DETAILED DESCRIPTION

Figure 1:
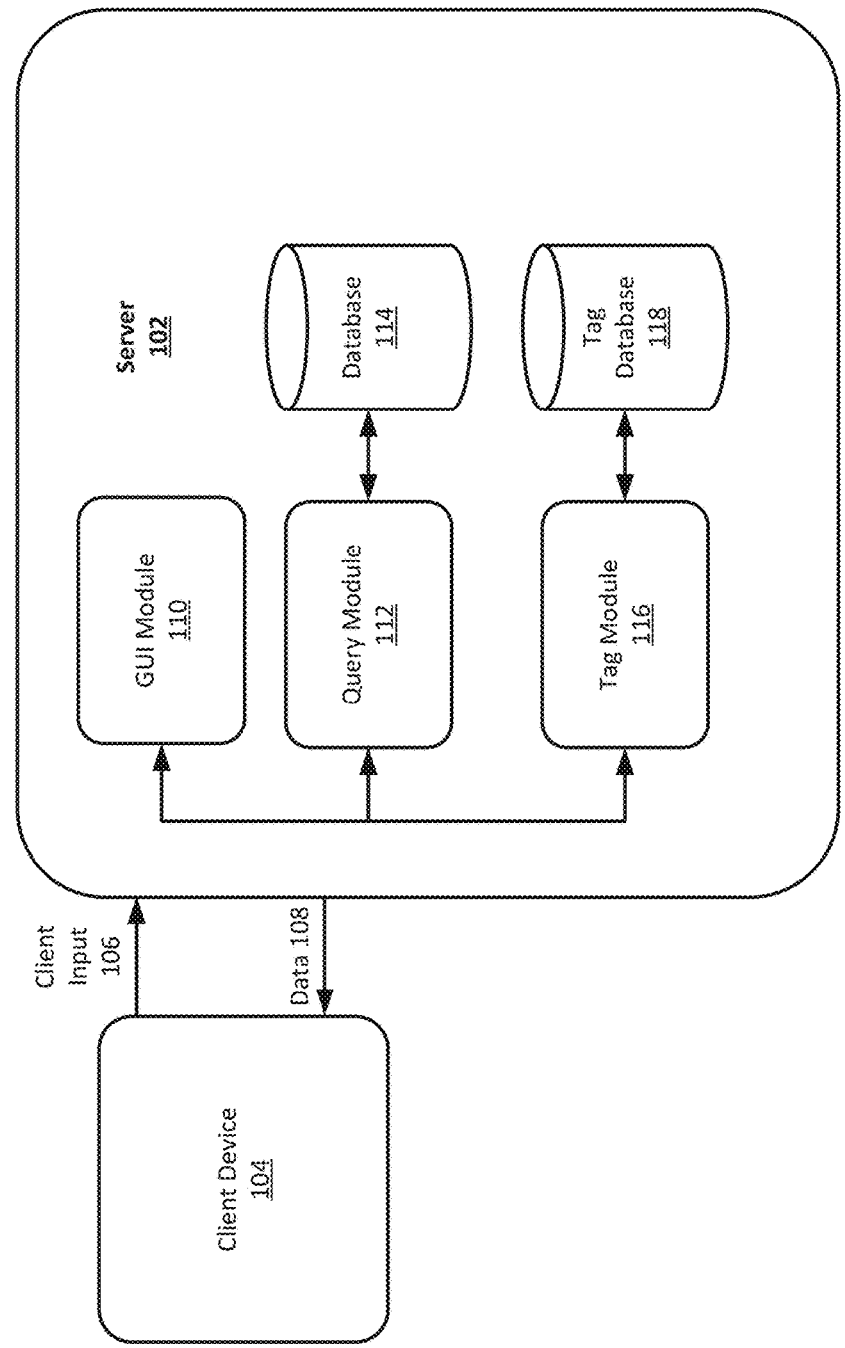
FIG. 1 illustrates an embodiment of a system.

Various embodiments are generally directed to techniques for automated database query generation. Techniques described herein may provide a user interface that informs a user of the information contained within database records, allows the user to interact with visual representations of database records, and automatically generated database queries based upon interactions with the user interface.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well-known structures and devices are shown in block diagram form in order to facilitate a description thereof. The intention is to cover all modifications, equivalents, and alternatives consistent with the claimed subject matter.

FIG. 1 illustrates a block diagram for a system 100. The system 100 may comprise one or more components configured to operate according to the embodiments and logic flows described herein. Although the system 100 shown in FIG. 1 has a limited number of elements in a certain topology, it may be appreciated that the system 100 may include more or less elements in alternate topologies as desired for a given implementation. The system 100 may include a server 102, which may be generally operative to interact with one or more components or modules within system 100. Server 102 may include one or more processing units, storage units, network interfaces, or other hardware and software elements, described in more detail below.

In an embodiment, each component may comprise a device, such as a server, comprising a network-connected storage device or multiple storage devices, such as one of the storage devices described in more detail herein. In an example, client device 104 may include one or more devices used to access software or web services provided by server 102. For example, client device 104 may include without limitation a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a tablet computer, a wearable computing device such as a smart watch, a server, a server array or server farm, a web server, a network server, an Internet server, a work station, a mini-computer, a mainframe computer, a supercomputer, a network appliance, a web appliance, multiprocessor systems, processor-based systems, or any variation or combination thereof.

In various embodiments, server 102 and the other components of system 100 may comprise or implement multiple components or modules. As used herein the terms "component" and "module" are intended to refer to computer-related entities, comprising either hardware, a combination of hardware and software, software, or software in execution. For example, a component and/or module can be implemented as a process running on a processor, a hard disk drive, multiple storage drives (of optical and/or magnetic storage medium), an object, an executable, a thread of execution, a program, and/or a computer. By way of illustration, both an application running on a server and the server can be a component and/or module. One or more components and/or modules can reside within a process and/or thread of execution, and a component and/or module can be localized on one computer and/or distributed between two or more computers as desired for a given implementation. The embodiments are not limited in this context.

The various devices within system 100, and components and/or modules within a device of system 100, may be communicatively coupled via various types of communications media as indicated by various lines or arrows. The devices, components and/or modules may coordinate operations between each other. The coordination may involve the uni-directional or bi-directional exchange of information. For instance, the devices, components and/or modules may communicate information in the form of non-transitory signals communicated over the communications media. The information can be implemented as signals allocated to various signal lines. In such allocations, each message is a signal. Further embodiments, however, may alternatively employ data messages. Such data messages may be sent across various connections. Exemplary connections within a device include parallel interfaces, serial interfaces, and bus interfaces. Exemplary connections between devices may comprise network connections over a wired or wireless communications network.

In various embodiments, the components and modules of the system 100 may be organized as a distributed system. A distributed system typically comprises multiple autonomous computers that communicate through a computer network. The computers interact with each other in order to achieve a common goal, such as solving computational problems. For example, a computational problem may be divided into many tasks, each of which is solved by one computer. A computer program that runs in a distributed system is called a distributed program, and distributed programming is the process of writing such programs. Examples of a distributed system may include, without limitation, a client-server architecture, a 3-tier architecture, an N-tier architecture, a tightly-coupled or clustered architecture, a peer-to-peer architecture, a master-slave architecture, a shared database architecture, and other types of distributed systems. It is worthy to note that although some embodiments may utilize a distributed system when describing various enhanced techniques for data retrieval, it may be appreciated that the enhanced techniques for data retrieval may be implemented by a single computing device as well. The embodiments are not limited in this context.

In an embodiment, client device 104 may include a display with a graphical user interface (GUI). As described in more detail herein, particularly with respect to FIGS. 7A-E, FIGS. 8A-E, and FIGS. 9A-D, the GUI may display user interface elements that represent data records stored within a database 114, which may be stored remotely on server 102. In some embodiments, database 114 may be locally stored on client device 104, however, for illustrative purposes, database 114 will be described as being stored on a non-transitory computer-readable storage medium of server 102. Client device 104 may also include one or more input devices, described herein, such as a touch screen or mouse/keyboard. Using these input devices, a user of client device 104 may select one or more user interface elements of a GUI, which may send client input 106 to server 102. Client input 106 may include data indicating the selection of one or more user interface elements on client device 104.

In some embodiments, GUI module 110 of server 102 may configure the GUI of client device 104 with one or more user interface elements representing data records within database 114. In some embodiments, a user interface element may appear as an icon, a shape, a listing, or other indication of the data records. In some embodiments, user interface elements may vary in shape, color, and/or size based upon the type and/or number of data records represented. User interface elements may have a variety of characteristics, such as size, color, shape, tag, field type, font, and others.

GUI module 110 may be configured to receive client input 106, which may include information with respect to the selection and/or placement of one or more user interface elements in a GUI. Client input 106 may also include information with respect to data associated with one or more user interface elements, such as, but not limited to, the tag associated with the user interface element, and/or any characteristics associated with the user interface element.

GUI module 110 may communicate with query module 112 and tag module 116 to share the received client input 106. For example, GUI module 110 may indicate to query module 112 the selected tags and the manner in which the tags were selected, i.e., individually, or dragged onto one another, as described herein. Further, GUI module 110 may indicate to tag module 116 the tags and types of fields associated with certain selected user interface elements. GUI module 110 may be configured to automatically update the configuration of the GUI on client device 104 based upon responses from one or both of query module 112 and tag module 116, as described herein.

In an embodiment, query module 112 may communicate with GUI module 110 to automatically generate database queries for database 114. For example, rather than a user be required to create a database query, the user may interact with one or more user interface elements within a GUI of client device 104 and GUI module 110 may communicate information to query module 112 about those interactions. Interactions with a GUI are described in detail herein with respect to FIGS. 7A-E, 8A-E, and 9A-D. GUI module 110 may communicate information including, but not limited to, specific user interface elements that have been selected, user interface elements that have been combined, user interface elements that have been unselected, and any other interactions between a user and a GUI of client device 104.

In an embodiment, query module 112 may be operated by one or more processors of server 102, and may automatically generate queries based upon communicated user interactions from GUI module 110. Examples of generated queries are described herein with respect to the exemplary embodiments described with respect to FIGS. 7A-E, 8A-E, and 9A-D. Such generated queries may be stored on a non-transitory computer-readable storage medium and used to query results from database 114. Query module 112 may submit automatically generated queries to database 114, and may receive results in response. Results may be shared with GUI module 110 via data 108 so that GUI module 110 may automatically configure the GUI in a manner consistent with the embodiments described herein.

In an embodiment, tag module 116 may communicate with GUI module 110 to configure the tags available within a GUI of client device 104. For example, in an initial state, a GUI may display a certain number of default tags, which may be automatically chosen by the system or manually configured by a user. However, the initial view of tags displayed within a GUI may not include the entire number of available tags associated with records of database 114. As described herein, certain user interface actions may be used to "unlock" tags that have previously not been shown within the GUI. Tag module 116 may communicate with GUI module 110, and may receive information with respect to selected tags and combined tags. Tag module 116 may automatically query a tag database 118 to determine whether selected and/or combined tags should trigger a new user interface element associated with a previously hidden tag. If so, tag module 116 may communicate relevant information via data 108, such as tag name and field type, to GUI module 110 so that a GUI of client device 104 may be update to reflect the new user interface element.

FIG. 2 illustrates an embodiment of a data record 200. In an example, data record 200 may be one of many data records stored within database 114. While certain data fields are included within data record 200, it can be appreciated that these fields are for illustrative purposes only and one of skill in the art can design a database in many ways. As such, more or less data fields may be present within a database, and much more complex database structures may be used. Data record 200 may include a unique ID 202, Date added 204, Date published 206, Type 208, Author 210, Title 212, and Abstract 214, the contents of which are readily apparent. In an embodiment, data record 200 includes Tags 216, which may include one or more tags associated with the data record. In some embodiments, a GUI module, query module, and tag module may utilize the contents of Tags 216 to present data on a GUI and/or perform queries for records within a database.

Figure 3:
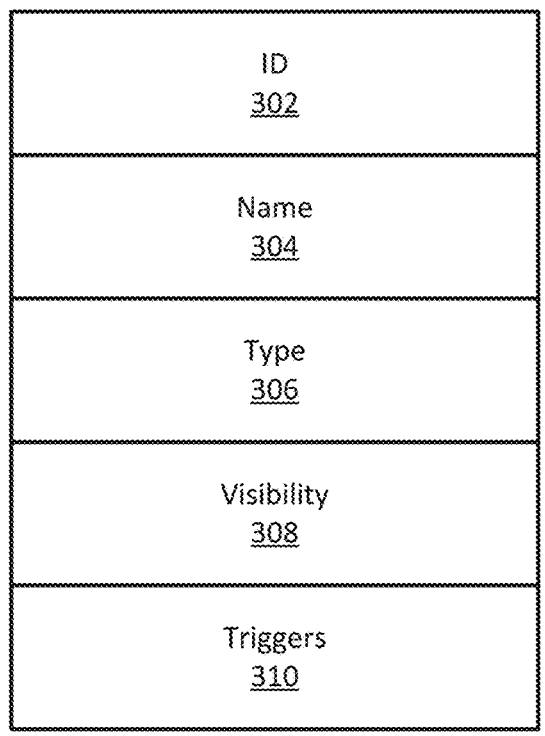
FIG. 3 illustrates an embodiment of a data record.

FIG. 3 illustrates an embodiment of a data record 300. In an example, data record 300 may be one of many data records stored within tag database 118. While certain data fields are included within data record 300, it can be appreciated that these fields are for illustrative purposes only and one of skill in the art may design a database in many ways. As such, more or less data fields may be present within a database, and much more complex database structures may be used. Data record 300 may represent a particular tag, which may be used to categorize data records within a database. As described herein, in an initial state, a GUI may display a certain number of default tags, which may be automatically chosen by the system or manually configured by a user. However, the initial view of tags displayed within a GUI may not include the entire number of available tags associated with records of a database. As described herein, certain user interface actions may be used to "unlock" tags that have previously not been shown within the GUI.

The data fields within data record 300 may be used by a tag module to determine tags should be unlocked within a GUI. These data field may include a unique ID 302 and Name 304. Further, a Type 306 may be used to identify a particular type associated with a tag, which is illustrated herein. A type may be a geographic region, type of asset, particular currency, or any subject that can be used to describe data. Data record 300 may also include Visibility 308, which may indicate whether a particular tag should be visible in an initial state. Some tags may be visible in an initial state of a GUI and other may not. Lastly, data record 300 may include a Triggers 310, which may include one or more other tags, or types of tags, that would trigger the display of the tag if it is hidden. For example, a 'Euro' tag may have initial visibility turned off, however, may include the trigger 'Europe+FX' such that when the tags 'Europe' and 'FX' are selected, the visibility of the 'Euro' tag is turned on and a GUI module may configure the display of the 'Euro' tag on a GUI.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer). For example, a logic flow may be implemented by a processor component executing instructions stored on an article of manufacture, such as a storage medium or a computer-program product. A storage medium may comprise any non-transitory computer-readable medium or machine-readable medium, such as an optical, magnetic or semiconductor storage. The storage medium may store various types of computer executable instructions, such as instructions to implement one or more disclosed logic flows. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The embodiments are not limited in this context.

Figure 4:
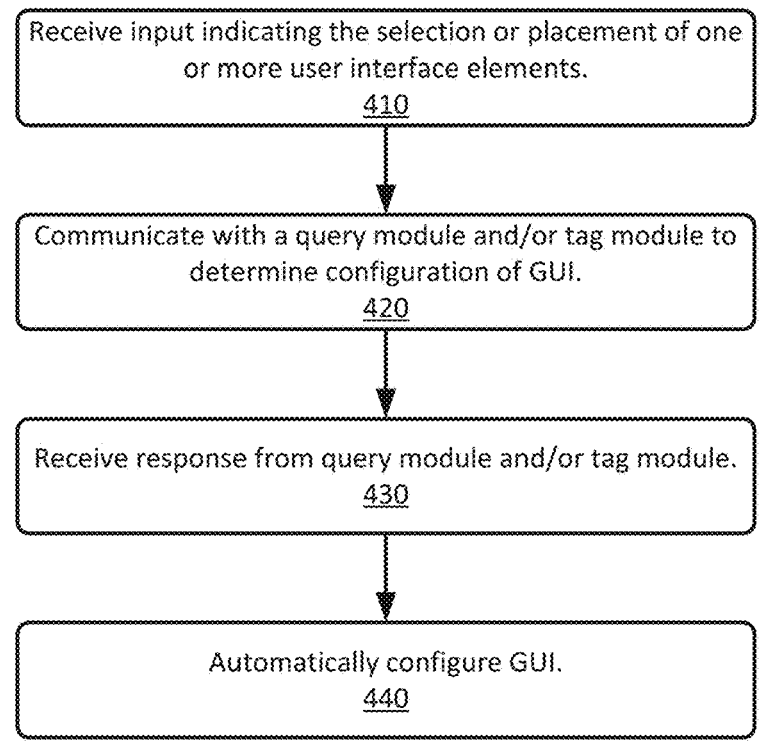
FIG. 4 illustrates a logic flow according to an embodiment.

FIG. 4 illustrates one embodiment of a logic flow 400. The logic flow 400 may be representative of some or all of the operations executed by one or more embodiments described herein. For instance, the logic flow 400 may be representative of some or all of the operations executed by system 100, and the components and modules included therein. For example, and without limitation, some of the operations described by logic flow 400 may be implemented by GUI module 110.

At 410, a GUI module may be configured to receive client input, which may include information with respect to the selection and/or placement of one or more user interface elements in a GUI. Client input 106 may also include information with respect to data associated with one or more user interface elements, such as, but not limited to, the tag associated with the user interface element, and/or any characteristics associated with the user interface element.

At 420, a GUI module may communicate with query module and/or tag module to share the received client input. For example, a GUI module may indicate to a query module the selected tags and the manner in which the tags were selected, i.e., individually, or dragged onto one another, as described herein. Further, a GUI module may indicate to a tag module the tags and types of fields associated with certain selected user interface elements.

At 430, a GUI module may be configured to receive a response from a query module and/or tag module. A response from a query module may indicate data with respect to a number of records to be displayed with respect to associated tags. The number of records may be determined based upon an automatic query generated by the query module. A response from a tag module may include one or more tags that should be added to the GUI based upon selections and/or manipulations within the client input. Based upon the responses, at 440, a GUI module may automatically update the configuration of the GUI on a client device.

Figure 5:
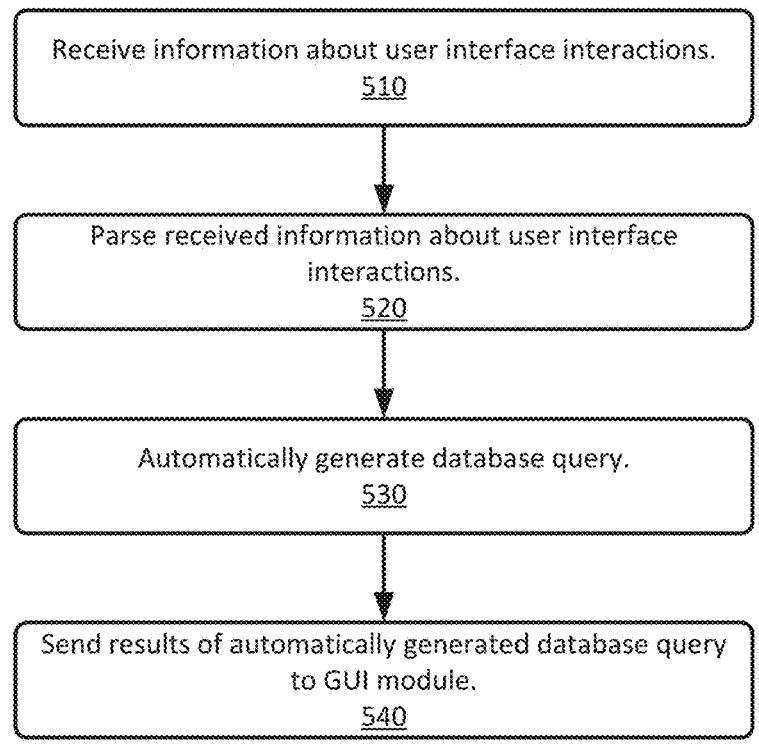
FIG. 5 illustrates a logic flow according to an embodiment.

FIG. 5 illustrates one embodiment of a logic flow 500. The logic flow 500 may be representative of some or all of the operations executed by one or more embodiments described herein. For instance, the logic flow 500 may be representative of some or all of the operations executed by system 100, and the components and modules included therein. For example, and without limitation, some of the operations described by logic flow 400 may be implemented by query module 112.

At 510, a query module may receive information about user interface interactions from a GUI module. For example, rather than a user be required to create a database query, the user may interact with one or more user interface elements within a GUI of a client device and a GUI module may communicate information to a query module about those interactions. Interactions with a GUI are described in detail herein with respect to FIGS. 7A-E, 8A-E, and 9A-D. A GUI module may communicate information including, but not limited to, specific user interface elements that have been selected, user interface elements that have been combined, user interface elements that have been unselected, and any other interactions between a user and a GUI of a client device. Identification of user interface elements may include, inter alia, identification of tags associated with those user interface elements. Further, user interactions may include information identifying whether user interface elements were individually selected, or dragged onto one another, as illustrated further herein.

At 520, a query module may parse the received information into tags and operations. For example, if two tags are received, A and B, and the interaction is identified as A being dragged onto B, a query module may parse the information into the tags A and B, and parse a corresponding operator OR. In another example, if three tags are received, A, B, and C, and the interaction is identified as individual selection, a query module may parse the information into tags A, B, and C, and parse a corresponding operator AND.

At 530, a query module may automatically generate one or more queries based upon the parsed information from a GUI module. Examples of generated queries are described herein with respect to the exemplary embodiments described with respect to FIGS. 7A-E, 8A-E, and 9A-D. Such generated queries may be stored on a non-transitory computer-readable storage medium and used to query results from a database. A query module may submit automatically generated queries to a database, and may receive results in response. At 540, results may be shared with a GUI module so the GUI module may automatically configure the GUI in a manner consistent with the embodiments described herein.

Figure 6:
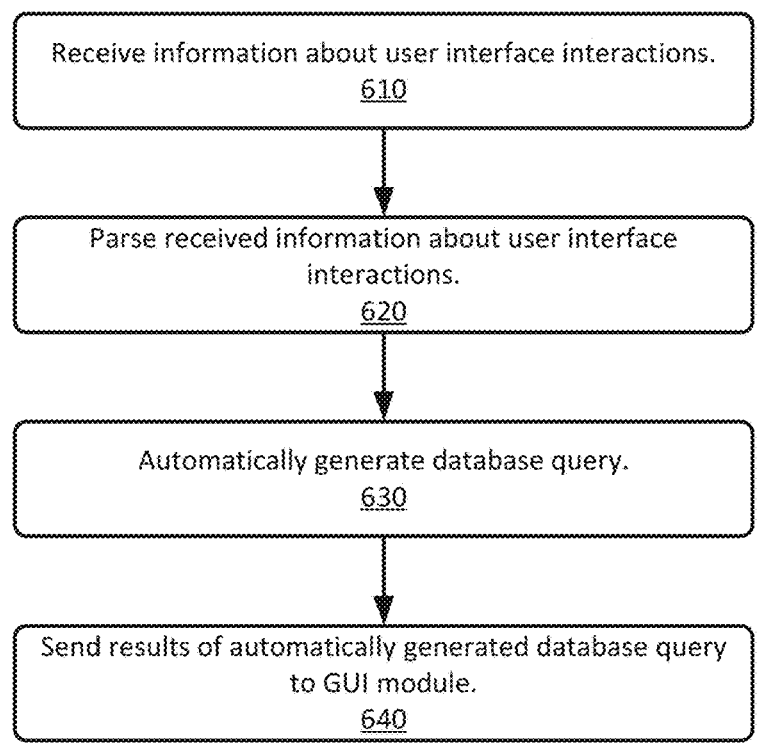
FIG. 6 illustrates a logic flow according to an embodiment.

FIG. 6 illustrates one embodiment of a logic flow 600. The logic flow 600 may be representative of some or all of the operations executed by one or more embodiments described herein. For instance, the logic flow 600 may be representative of some or all of the operations executed by system 100, and the components and modules included therein. For example, and without limitation, some of the operations described by logic flow 400 may be implemented by tag module 116.

At 610, a tag module may receive information about user interface interactions from a GUI module. For example, rather than a user be required to create a database query, the user may interact with one or more user interface elements within a GUI of a client device and a GUI module may communicate information to a query module about those interactions. Interactions with a GUI are described in detail herein with respect to FIGS. 7A-E, 8A-E, and 9A-D. A GUI module may communicate information including, but not limited to, specific user interface elements that have been selected, user interface elements that have been combined, user interface elements that have been unselected, and any other interactions between a user and a GUI of a client device. Identification of user interface elements may include, inter alia, identification of tags associated with those user interface elements. Further, user interactions may include information identifying whether user interface elements were individually selected, or dragged onto one another, as illustrated further herein.

At 620, a tag module may parse the received information into tags and operations. For example, if two tags are received, A and B, and the interaction is identified as A being dragged onto B, a query module may parse the information into the tags A and B, corresponding to field 1 and 2, respectively. In this case, tag module may generate a query to a tag database at 630 to determine if the dragging of A onto B, of field types 1 and 2, respectively, should trigger the display of an additional user interface element. For example, in an initial state, a GUI may display a certain number of default tags, which may be automatically chosen by the system or manually configured by a user. However, the initial view of tags displayed within a GUI may not include the entire number of available tags associated with records of a database. As described herein, certain user interface actions may be used to "unlock" tags that have previously not been shown within the GUI. A tag module may automatically query a tag database to determine whether selected and/or combined tags should trigger a new user interface element associated with a previously hidden tag.

At 640, a tag module may communicate with a GUI module to configure the tags available within a GUI of a client device. In some embodiments, one or more new user interface elements may be triggered based upon user interface interactions from the GUI module. In other cases, no new user interface elements may be triggered.

Figure 7A:
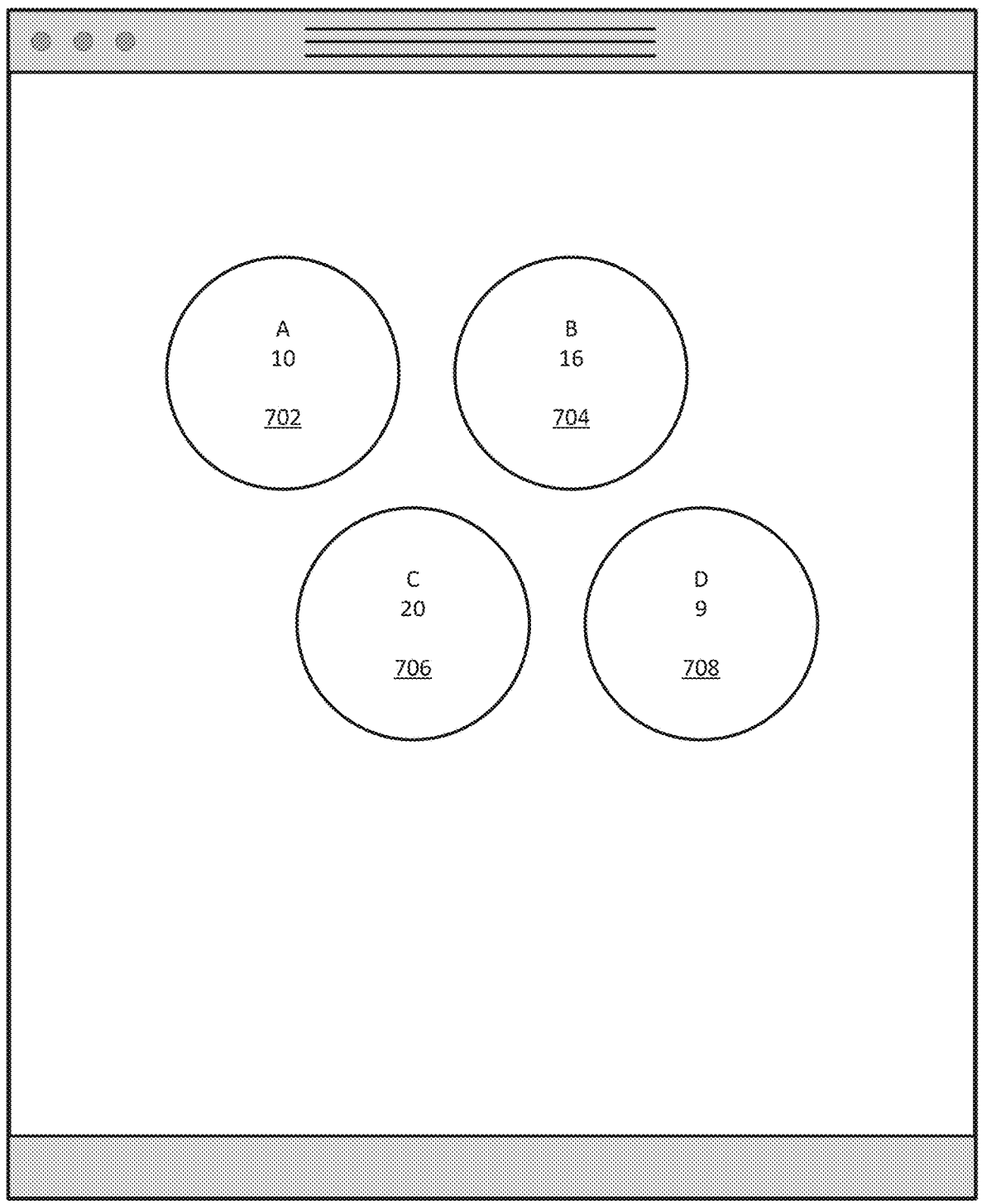
FIGS. 7A-7E illustrate a user interface according to an embodiment.

FIGS. 7A-7E illustrate a user interface 700 according to an embodiment. The user interface may be displayed using a GUI on the display of a client device, for example. FIG. 7A illustrates four user interface elements, however, more or less may be displayed. Further, while only four user interface elements of the same type are shown for purposes of illustration, it can be appreciated that more or less user interface element types may be used within user interface 700. Additional types of user interface elements are illustrated within FIGS. 9A-D. As shown, each of user interface elements 702, 704, 706, and 708 are represented as circles of the same size and color. However, in some embodiments, the shape, size, and color of these user interface elements may change based upon the type and volume of data represented. For example, a user interface element tagged with A may be represented in a different color than a user interface element tagged with B. Further, a user interface element representing 10 data records may appear twice the size, or at least larger, than a user interface element representing 5 data records. In this manner, a user of the GUI may be able to readily ascertain the type and volume of data records stored within a database.

As illustrated, each user interface element displays a tag (A, B, C, D), which may include a title for a particular topic, for example. Different tags may be used in various embodiments based upon factors such as the type of data records within a given database. Along with a tag, each user interface element may include a number representing a number of data records within a database corresponding to the tag. In user interface 700, user interface element 702 has a tag A and corresponds to 10 data records within a database tagged with A. User interface element 704 has a tag B and corresponds to 16 data records within a database tagged with B. User interface element 706 has a tag C and corresponds to 20 data records within a database tagged with C. User interface element 708 has a tag D and corresponds to 9 data records within a database tagged with D. It can be appreciated that a single data record within a database may be associated with multiple tags. For example, a single data record may be tagged with A and B, thus both user interface elements 702 and 704 may include the same data record within their count.

The user interface elements 702, 704, 706, and 708 may be displayed in an initial state. In the initial state, user interface elements may be displayed to a user and may be selectable and draggable throughout the GUI. A GUI module, such as GUI module 110, may be configured to interact with a query module, such as query module 112, to query a database, such as database 114, to obtain information to display. Likewise, a GUI module, such as GUI module 110, may be configured to interact with a tag module, such as tag module 116, to obtain tag information to display. In an example, a GUI module may configure the display of an initial state by requesting all data records from a database and may do so by requesting that a query module generate a database query. In one example, a query module may generate a "SELECT * FROM DB" query, which will retrieve information on all data records within a database. While exemplary queries may be described herein, it can be appreciate that a query module may generate queries for various database types.

Figure 7B:
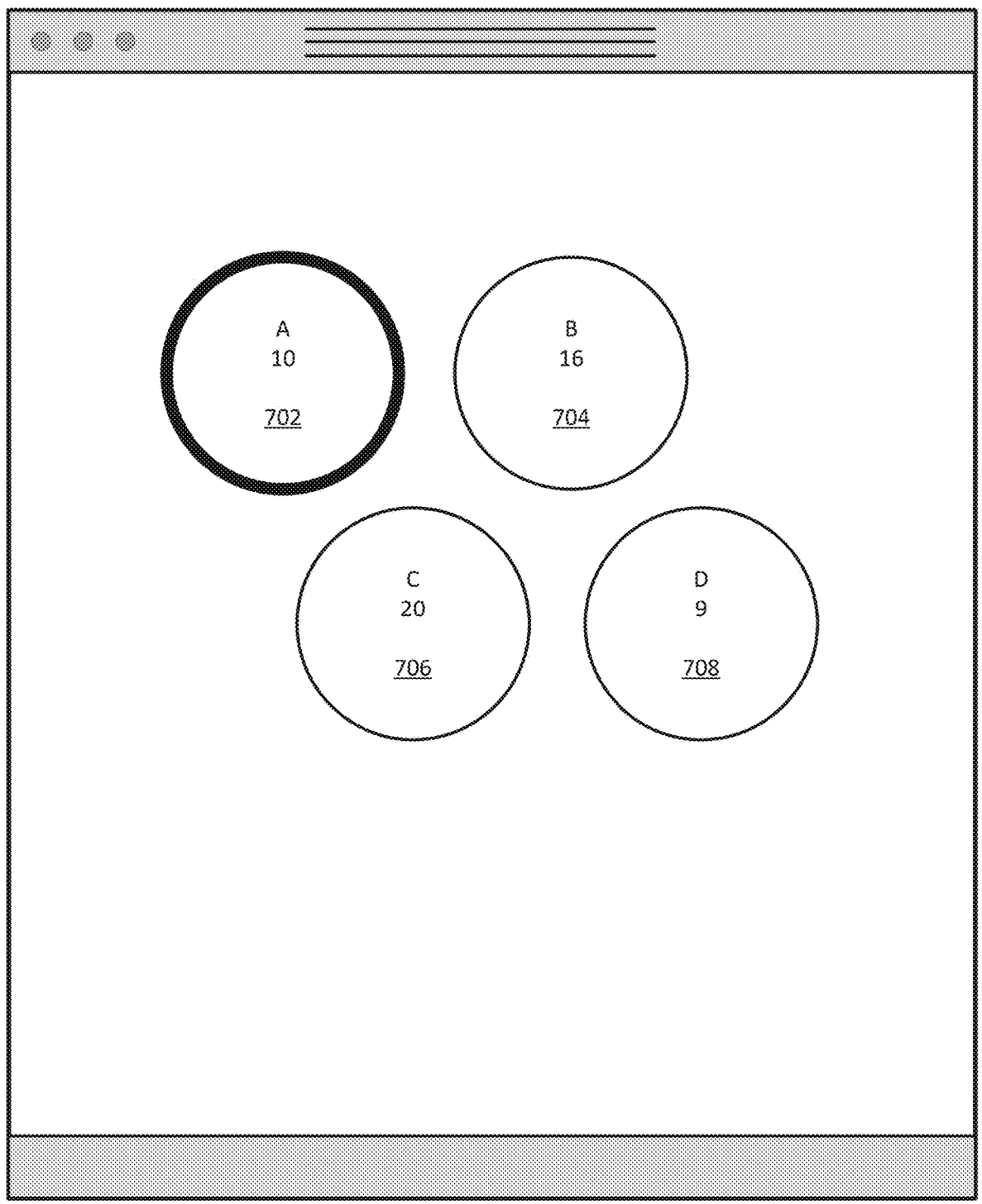

FIG. 7B illustrates user interface 700 in a selection state. As shown, user interface element 702 has been highlighted, indicating that it has been selected by a user using an input device of a client device. For purposes of illustration, highlighting the outer portion of user interface element 702 is shown, however, other indications of selection may be used. By way of example and not limitation, selection may be shown using highlighting, animation, change in size, and/or change in color.

Once selected, input may be sent from a client device to a GUI module of a server. The GUI module may interact with a query module to automatically generate a database query based upon the selection. For example, selection of user interface element 702 may automatically generate a query "SELECT * FROM DB WHERE TAG='A'". The response to the query may be sent from a query module to the GUI module. The GUI module may then configure the display of the user interface 700 accordingly. In the example illustrated within FIG. 7B, the counts within user interface elements 704, 706, and 708 may be updated to represent the number of data records within the database that are tagged with A. As shown, user interface element 704 indicates that 8 data records are associated with at least tags A and B. User interface element 706 indicates that 9 data records are associated with at least tags A and C. User interface element 708 indicates that 6 data records are associated with at least tags A and D.

Figure 7C:
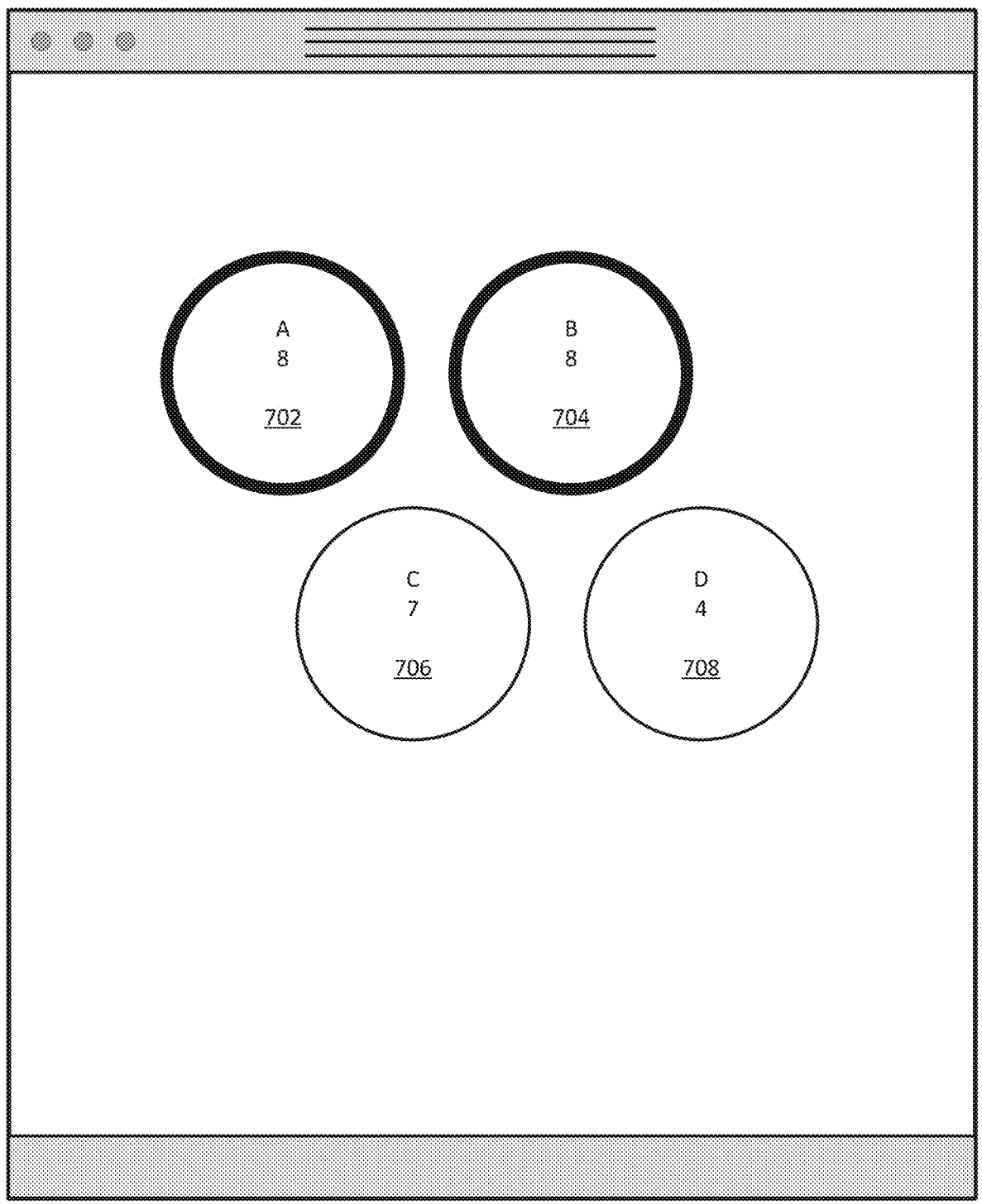

FIG. 7C illustrates user interface 700 in a selection state. As shown, user interface elements 702 and 704 have been selected and highlighted to indicate selection. When selected in this manner, i.e., selected independently from one another, it may indicate that a particular type of query should be generated. In one example, separately selecting multiple user interface elements may indicate that an AND operation should be generated. In other embodiments, selecting multiple user interface elements independently may indicate an OR operation. Further, the user may be presented with options with respect to the automated generation of database queries, and may be able to choose the type of query that should be generated in response to a particular selection of user interface elements.

In this example, selection of user interface elements 702 and 704 may automatically generate a query "SELECT * FROM DB WHERE TAG='A' AND TAG='B'". The response to the query may be sent from a query module to the GUI module. The GUI module may then configure the display of the user interface 700 accordingly. In the example illustrated within FIG. 7C, the counts within user interface elements 706, and 708 may be updated to represent the number of data records within the database that are tagged with A and B. As shown, user interface element 706 indicates that 7 data records are associated with at least tags A, B, and C. User interface element 708 indicates that 4 data records are associated with at least tags A, B, and D.

Figure 7D:
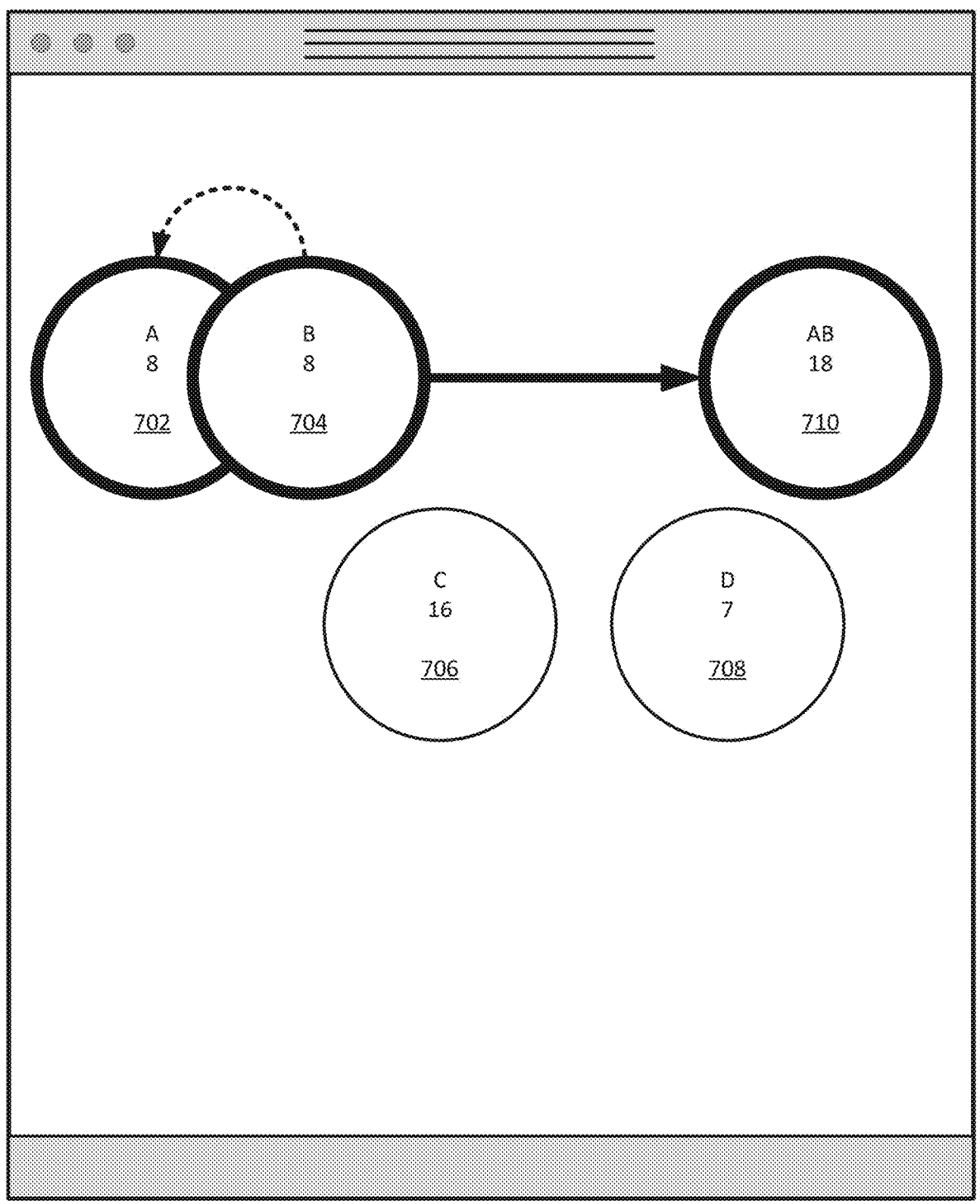

FIG. 7D illustrates user interface 700 in a selection state. As shown, user interface element 704 has been dragged onto user interface element 702 within the GUI to create a combined user interface element 710. When selected in this manner, i.e., dragging one user interface element onto another user interface element, it may indicate that a particular type of query should be generated. In one example, dragging one user interface element onto another user interface element may indicate that an OR operation should be generated. In other embodiments, dragging one user interface element onto another user interface element may indicate an AND operation. Further, the user may be presented with options with respect to the automated generation of database queries, and may be able to choose the type of query that should be generated in response to a particular selection of user interface elements.

In this example, selection of user interface elements 702 and 704 by dragging one onto the other and creating combined user interface element 710 may automatically generate a query "SELECT * FROM DB WHERE TAG='A' OR TAG='B'". The response to the query may be sent from a query module to the GUI module. The GUI module may then configure the display of the user interface 700 accordingly. In the example illustrated within FIG. 7D, the counts within user interface elements 710, 706, and 708 may be updated to represent the number of data records within the database that are tagged with A or B. As shown, user interface element 710 indicates that 18 records are associated with A or B. User interface element 706 indicates that 16 data records are associated with at least tags A or B, and C. User interface element 708 indicates that 7 data records are associated with at least tags A or B, and D.

Figure 7E:
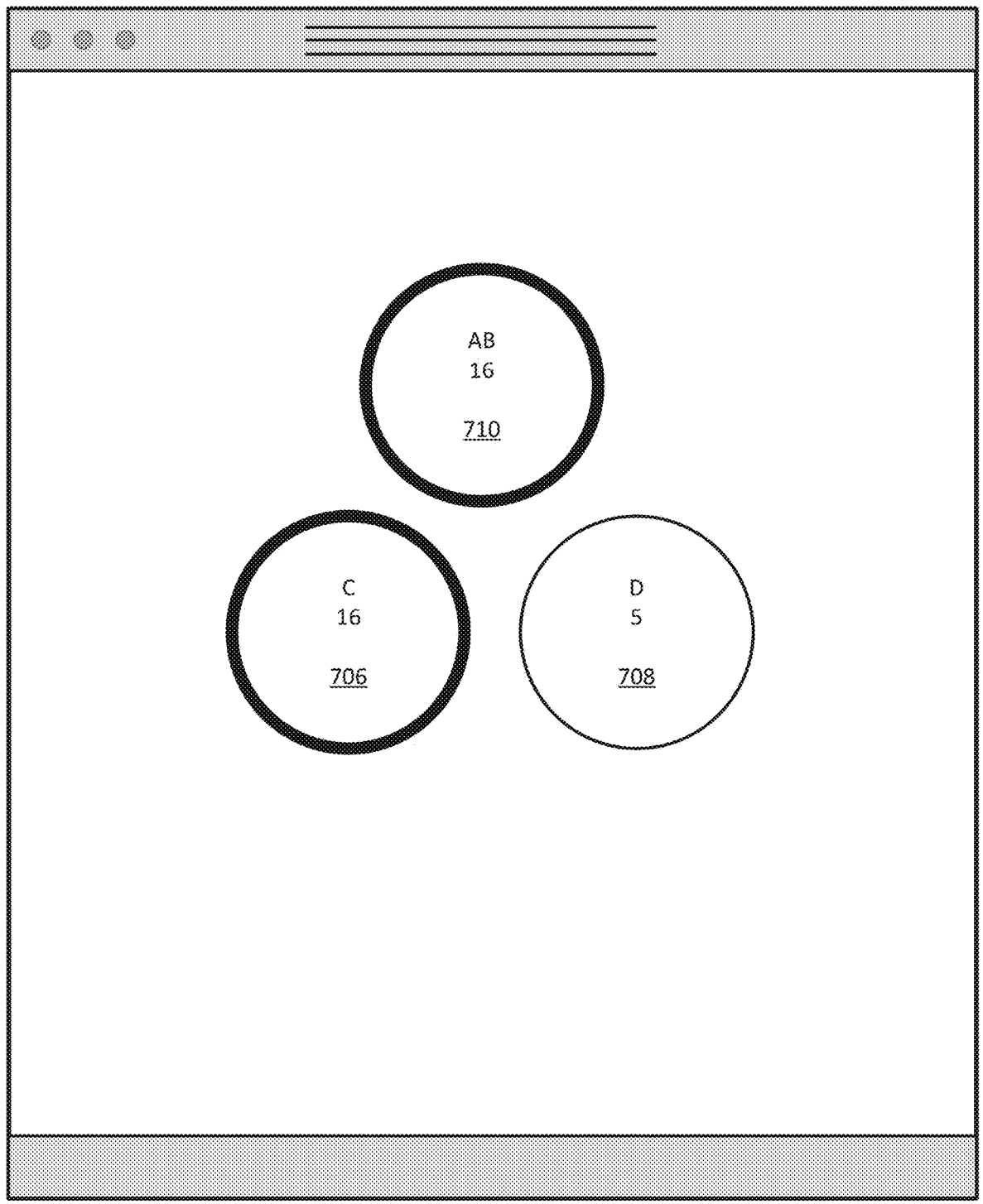

FIG. 7E illustrates user interface 700 in a selection state. As shown, user interface element 704 has been dragged onto user interface element 702 within the GUI to create a combined user interface element 710, as described with respect to FIG. 7D. When selected in this manner, i.e., dragging one user interface element onto another user interface element, it may indicate that a particular type of query should be generated. In one example, dragging one user interface element onto another user interface element may indicate that an OR operation should be generated. User interface element 706 may be selected in addition to creating a combined user interface element 710. This may indicate an additional AND operation. In this manner, more complex queries of a database may be generated that combine multiple AND, OR, or other operations. Since user interface elements are automatically updated with an indication of a number of data records, a user may use a layered approach of user interface element selection to develop a narrow query of a database.

In this example, selection of user interface elements 702 and 704 by dragging one onto the other and creating combined user interface element 710 may automatically generate a query "SELECT * FROM DB WHERE TAG='A' OR TAG='B'". The additional selection of user interface item 706 may add an AND operation resulting in the query "SELECT * FROM DB WHERE TAG='C' AND (TAG='A' OR TAG='B')". The response to the query may be sent from a query module to the GUI module. The GUI module may then configure the display of the user interface 700 accordingly. In the example illustrated within FIG. 7E, the counts within user interface elements 710, 706, and 708 may be updated to represent the number of data records within the database that are tagged with A or B, and C. As shown, user interface element 710 indicates that 16 records are associated with A or B, and C. User interface element 706 indicates that 16 data records are associated with at least tags A or B, and C. User interface element 708 indicates that 5 data records are associated with at least tags A or B, and C, and D.

Figure 8A:
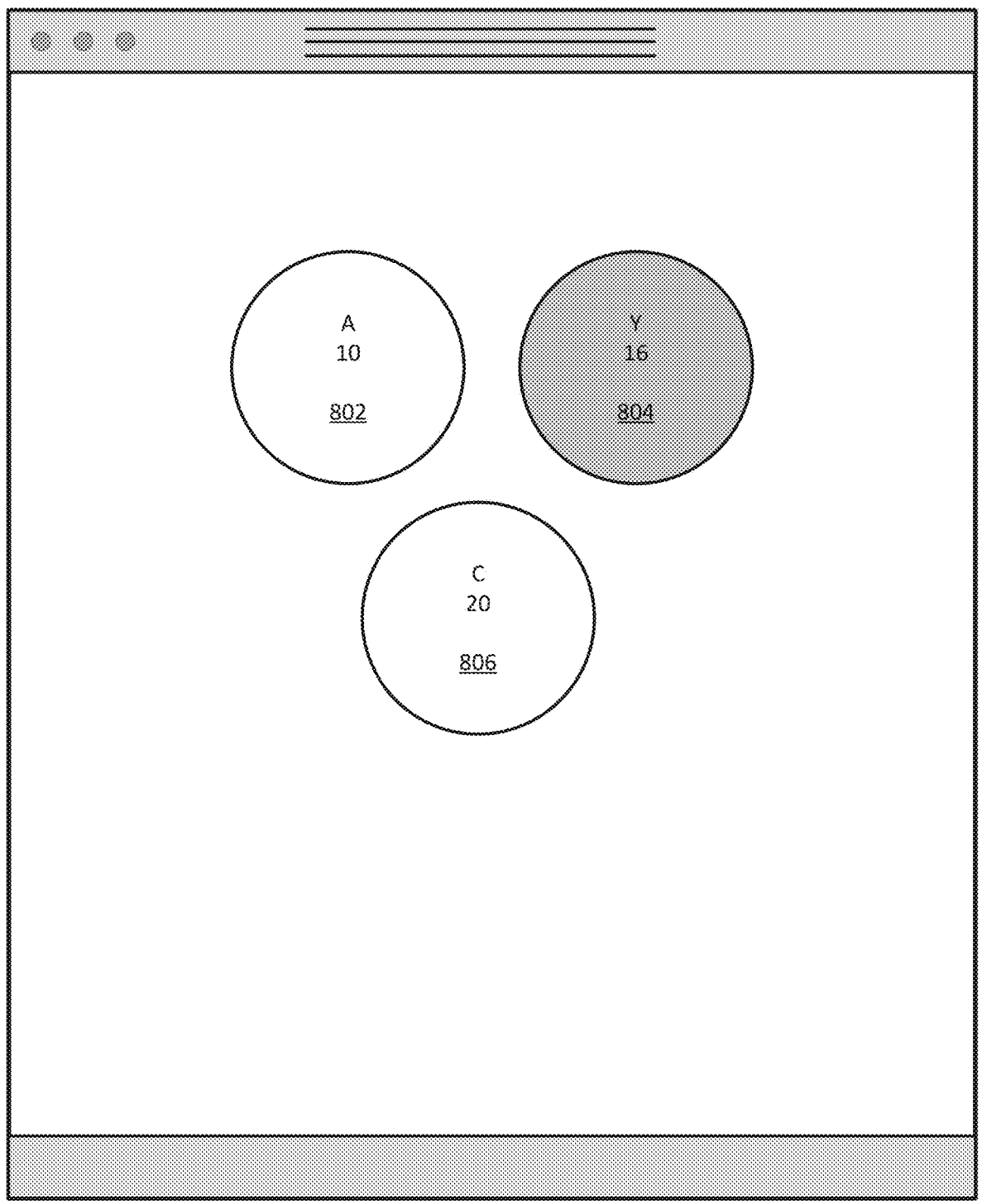
FIGS. 8A-8E illustrate a user interface according to an embodiment.

FIGS. 8A-8E illustrate a user interface 800 according to an embodiment. The user interface may be displayed using a GUI on the display of a client device, for example. FIG. 8A illustrates three user interface elements, however, more or less may be displayed. Further, while only three user interface elements of the same type are shown for purposes of illustration, it can be appreciated that more or less user interface element types may be used within user interface 800. Additional types of user interface elements are illustrated within FIGS. 9A-D. As shown, each of user interface elements 802, 804, and 806 are represented as circles of the same size. However, in some embodiments, the shape, size, and color of these user interface elements may change based upon the type and volume of data represented. For example, a user interface element tagged with A may be represented in a different color than a user interface element tagged with Y, as shown by user interface elements 802 and 804. In some embodiments, tags A and Y may be categorized within different fields within a database. Thus, a tag from one field may be displayed in a different manner than a tag from another field. Further, a user interface element representing 10 data records may appear twice the size, or at least larger, than a user interface element representing 5 data records. In this manner, a user of the GUI may be able to readily ascertain the type and volume of data records stored within a database.

As illustrated, each user interface element displays a tag (A, Y, C), which may include a title for a particular topic, for example. Different tags may be used in various embodiments based upon factors such as the type of data records within a given database. Along with a tag, each user interface element may include a number representing a number of data records within a database corresponding to the tag. In user interface 800, user interface element 802 has a tag A and corresponds to 10 data records within a database tagged with A. User interface element 804 has a tag Y and corresponds to 16 data records within a database tagged with Y. User interface element 806 has a tag C and corresponds to 20 data records within a database tagged with C. It can be appreciated that a single data record within a database may be associated with multiple tags. For example, a single data record may be tagged with A and Y, thus both user interface elements 802 and 804 may include the same data record within their count.

The user interface elements 802, 804, and 806 may be displayed in an initial state. In the initial state, user interface elements may be displayed to a user and may be selectable and draggable throughout the GUI. A GUI module, such as GUI module 110, may be configured to interact with a query module, such as query module 112, to query a database, such as database 114, to obtain information to display. Likewise, a GUI module, such as GUI module 110, may be configured to interact with a tag module, such as tag module 116, to obtain tag information to display. In an example, a GUI module may configure the display of an initial state by requesting all data records from a database and may do so by requesting that a query module generate a database query. In one example, a query module may generate a "SELECT * FROM DB" query, which will retrieve information on all data records within a database. While exemplary queries may be described herein, it can be appreciate that a query module may generate queries for various database types.

Figure 8B:
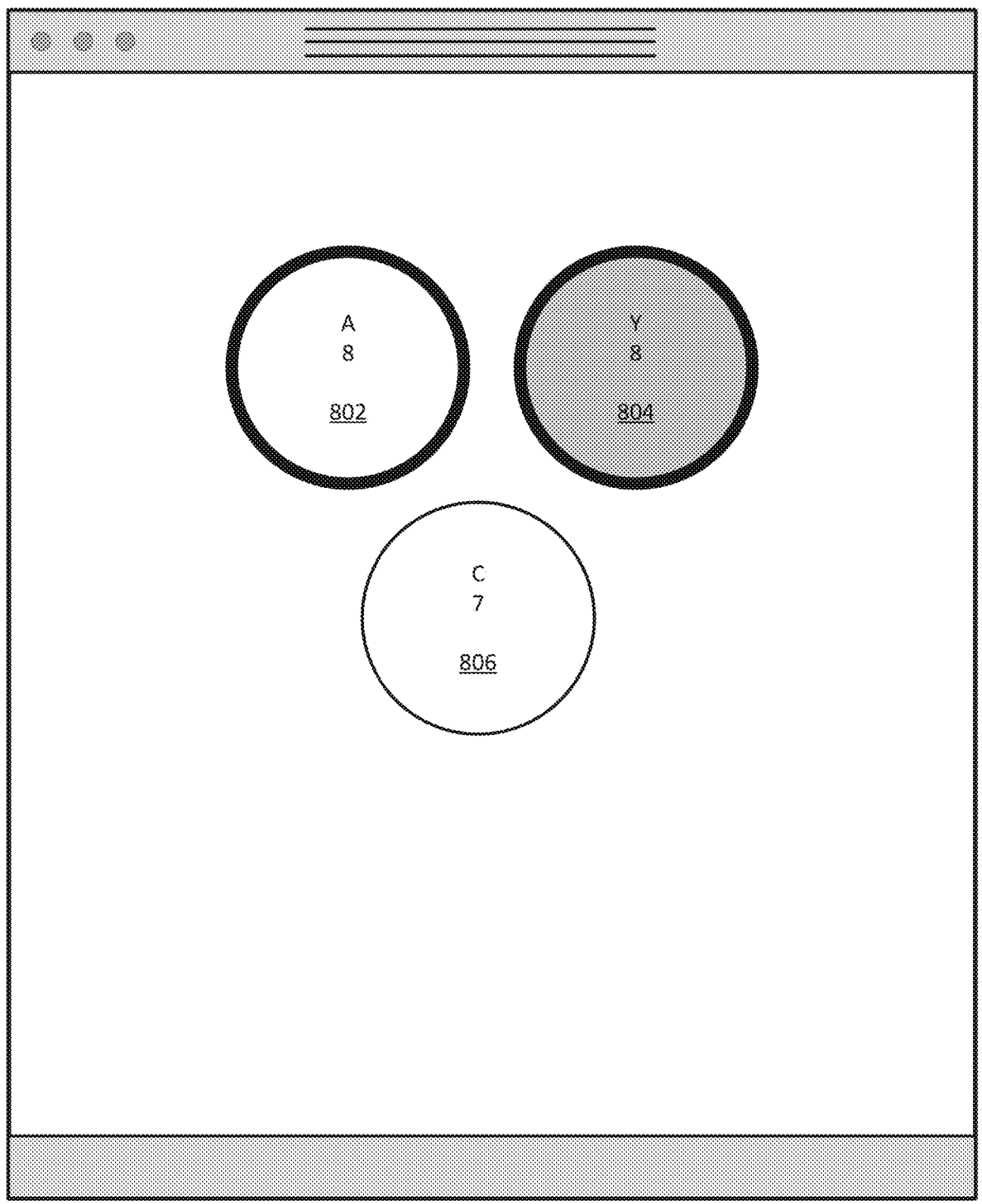

FIG. 8B illustrates user interface 800 in a selection state. As shown, user interface elements 802 and 804 have been highlighted, indicating that they have been selected by a user using an input device of a client device. For purposes of illustration, highlighting the outer portion of user interface elements 802 and 804 is shown, however, other indications of selection may be used. By way of example and not limitation, selection may be shown using highlighting, animation, change in size, and/or change in color.

As shown in FIG. 8B, user interface elements 802 and 804 have been selected and highlighted to indicate selection. When selected in this manner, i.e., selected independently from one another, it may indicate that a particular type of query should be generated. In one example, separately selecting multiple user interface elements may indicate that an AND operation should be generated. In other embodiments, selecting multiple user interface elements independently may indicate an OR operation. Further, the user may be presented with options with respect to the automated generation of database queries, and may be able to choose the type of query that should be generated in response to a particular selection of user interface elements.

In this example, selection of user interface elements 802 and 804 may automatically generate a query "SELECT * FROM DB WHERE FIELD1='A' AND FIELD2='Y'". The response to the query may be sent from a query module to the GUI module. The GUI module may then configure the display of the user interface 800 accordingly. In the example illustrated within FIG. 8B, the counts within user interface elements 802, 804, and 806 may be updated to represent the number of data records within the database that are tagged with A and Y in the respective fields. As shown, user interface element 802 indicates that 8 data records are associated with at least tags A and Y. User interface element 804 indicates that 8 data records are associated with at least tags A and Y. User interface element 806 indicates that 7 data records are associated with at least tags A, Y, and C.

Figure 8C:
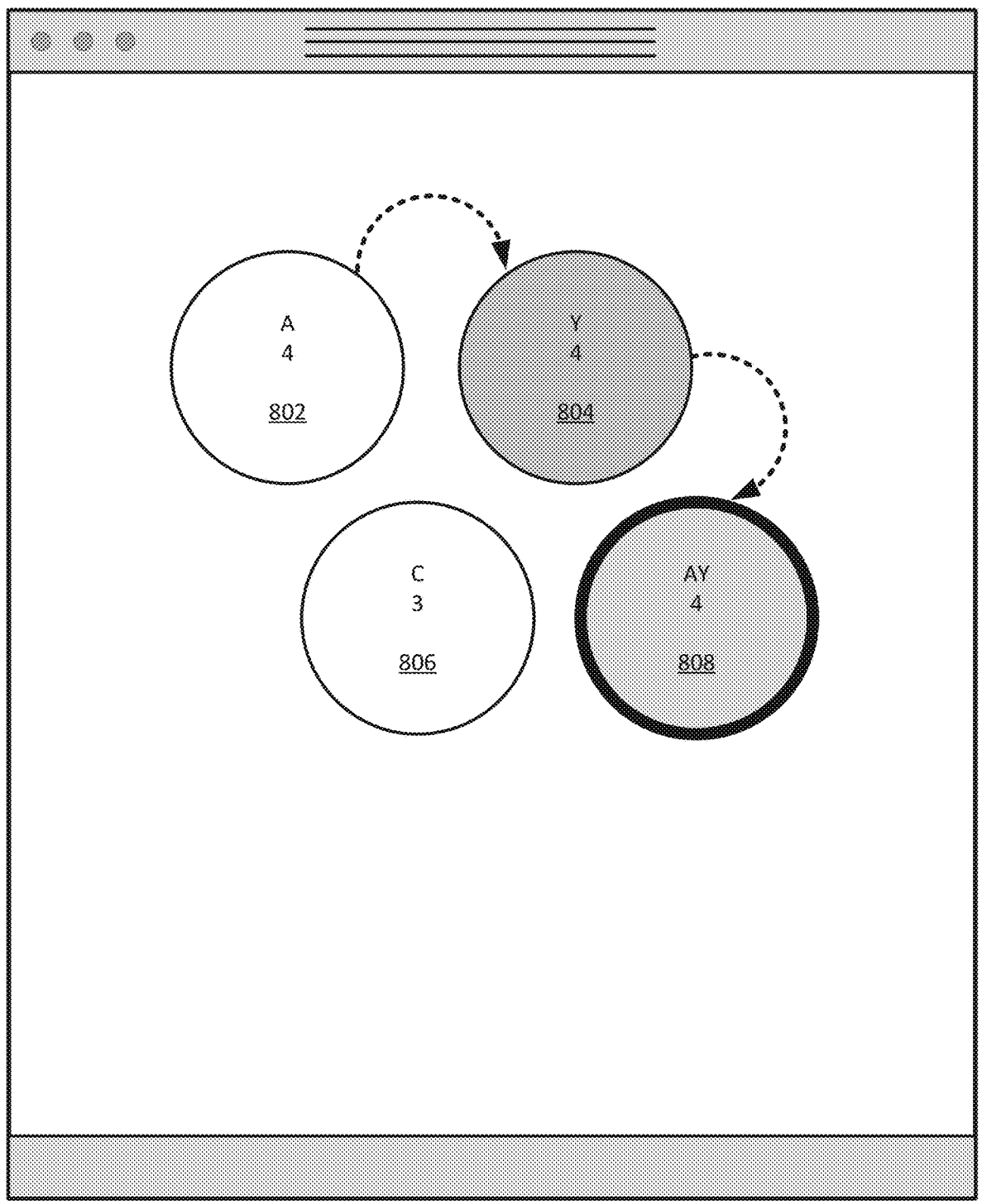

FIG. 8C illustrates user interface 800 in a selection state. As shown, user interface element 802 of a first field type has been dragged onto user interface element 804 of a second field type within the GUI to create a combined user interface element 808. When selected in this manner, i.e., dragging one user interface element of a first field type onto another user interface element with another field type, it may indicate that a new user interface element should be created and associated with a new field, which may not have been previously displayed within user interface 800. In an example, combining a user interface element associated with an 'Asset Class' field type with a user interface element associated with a 'Region' field type may automatically create a new user interface element associated with a field type, previously hidden, such as 'Asset.' Different field types may be displayed in different ways, and may be indicated by different colors. In one example, when a user interface element of a first color, indicating a first field type, is dragged onto a user interface element of a second color, indicating a second field type, a new user interface element of a third color may be generated by a GUI module to indicate a third field type.

In this example, selection of user interface elements 802 and 804 by dragging one onto the other and creating combined user interface element 808 may generate a new user interface element for field 'AY' and automatically generate a query "SELECT * FROM DB WHERE FIELD3='AY'". The response to the query may be sent from a query module to the GUI module. The GUI module may then configure the display of the user interface 800 accordingly. In the example illustrated within FIG. 8C, the counts within user interface elements 802, 804, and 806 may be updated to represent the number of data records within the database that are tagged with AY. As shown, user interface element 802 indicates that 4 records are associated with at least tags A and AY. User interface element 804 indicates that 4 data records are associated with at least tags Y and AY. User interface element 806 indicates that 3 data records are associated with at least tags C and AY.

Figure 8D:
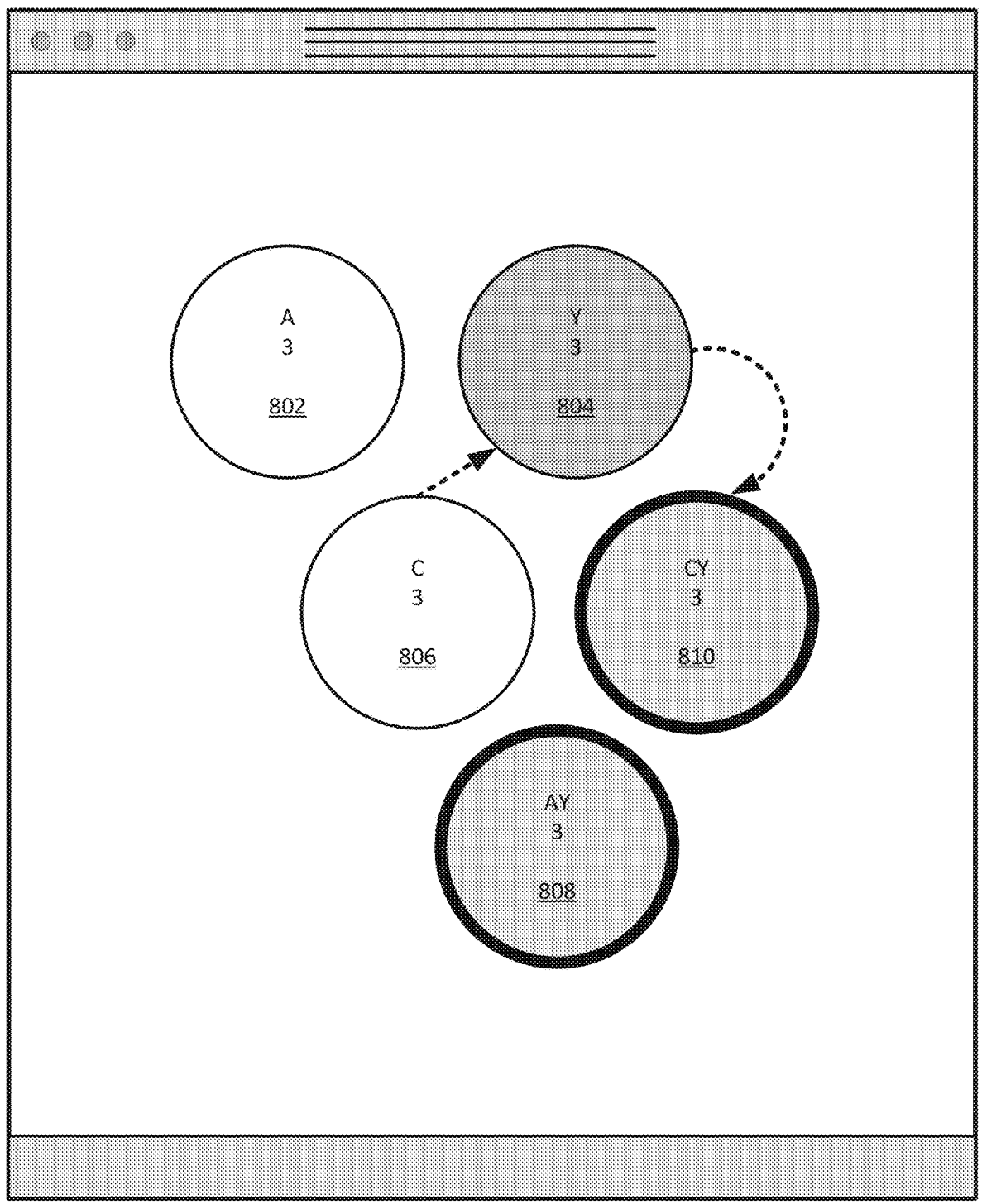

FIG. 8D illustrates a selection state within user interface 800. As shown, user interface element 806 of a first field type has been dragged onto user interface element 804 of a second field type within the GUI to create a combined user interface element 810. When selected in this manner, i.e., dragging one user interface element of a first field type onto another user interface element with another field type, it may indicate that a new user interface element should be created and associated with a new field, which may not have been previously displayed within user interface 800, as described above with respect to FIG. 8C.

In this example, selection of user interface elements 804 and 806 by dragging one onto the other and creating combined user interface element 810 may generate a new user interface element for field 'CY' and automatically generate a query "SELECT * FROM DB WHERE FIELD4='CY'". The response to the query may be sent from a query module to the GUI module. The GUI module may then configure the display of the user interface 800 accordingly. In the example illustrated within FIG. 8C, the counts within user interface elements 802, 804, 806, and 808 may be updated to represent the number of data records within the database that are tagged with CY. As shown, user interface element 802 indicates that 3 records are associated with at least tags A and CY. User interface element 804 indicates that 3 data records are associated with at least tags Y and CY. User interface element 806 indicates that 3 data records are associated with at least tags C and CY. User interface element 808 indicates that 3 data records are associated with at least tags AY and CY.

Figure 8E:
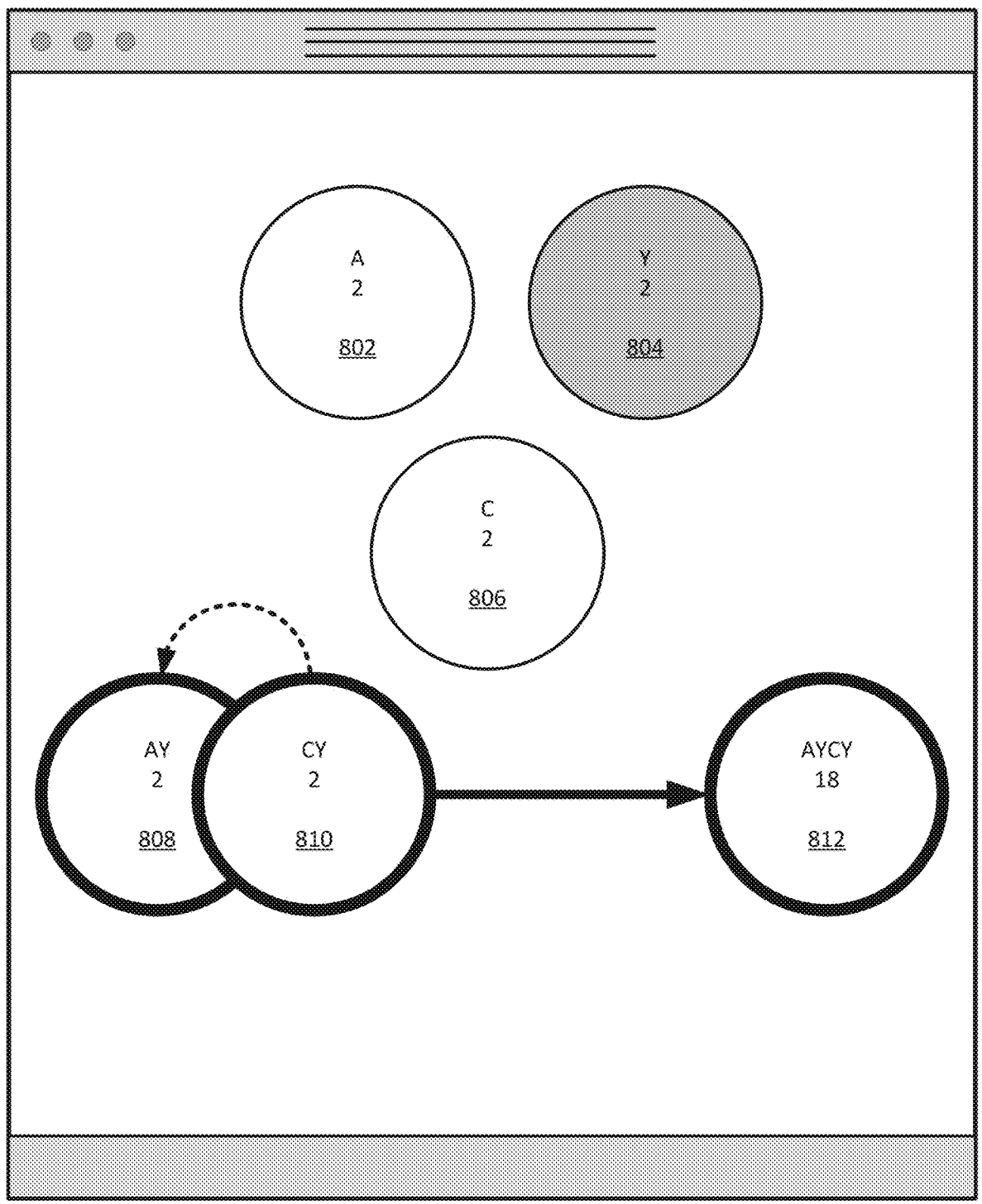

FIG. 8E illustrates a selection state within user interface 800. As shown, user interface element 808 of a first field type has been dragged onto user interface element 810 of a second field type within the GUI to create a combined user interface element 812. In this example, two previously hidden field types AY and CY, which were created in a manner consistent with the description of FIGS. 8C and 8D above, may be combined to create a further new user interface element 812 associated with a field AYCY. In this manner, not only can originally displayed user interface elements be combined to expose new user interface elements representing tags, but new user interface elements may also be combined.

In this example, selection of user interface elements 808 and 810 by dragging one onto the other and creating combined user interface element 812 may generate a new user interface element for field 'AYCY' and automatically generate a query "SELECT * FROM DB WHERE FIELD5='AYCY'". The response to the query may be sent from a query module to the GUI module. The GUI module may then configure the display of the user interface 800 accordingly. In the example illustrated within FIG. 8E, the counts within user interface elements 802, 804, 806, 808, and 810 may be updated to represent the number of data records within the database that are tagged with AYCY. As shown, user interface element 802 indicates that 2 records are associated with at least tags A and AYCY. User interface element 804 indicates that 2 data records are associated with at least tags Y and AYCY. User interface element 806 indicates that 2 data records are associated with at least tags C and AYCY. User interface element 808 indicates that 2 data records are associated with at least tags AY and AYCY. User interface element 810 indicates that 2 data records are associated with at least tags CY and AYCY.

Figure 9A:
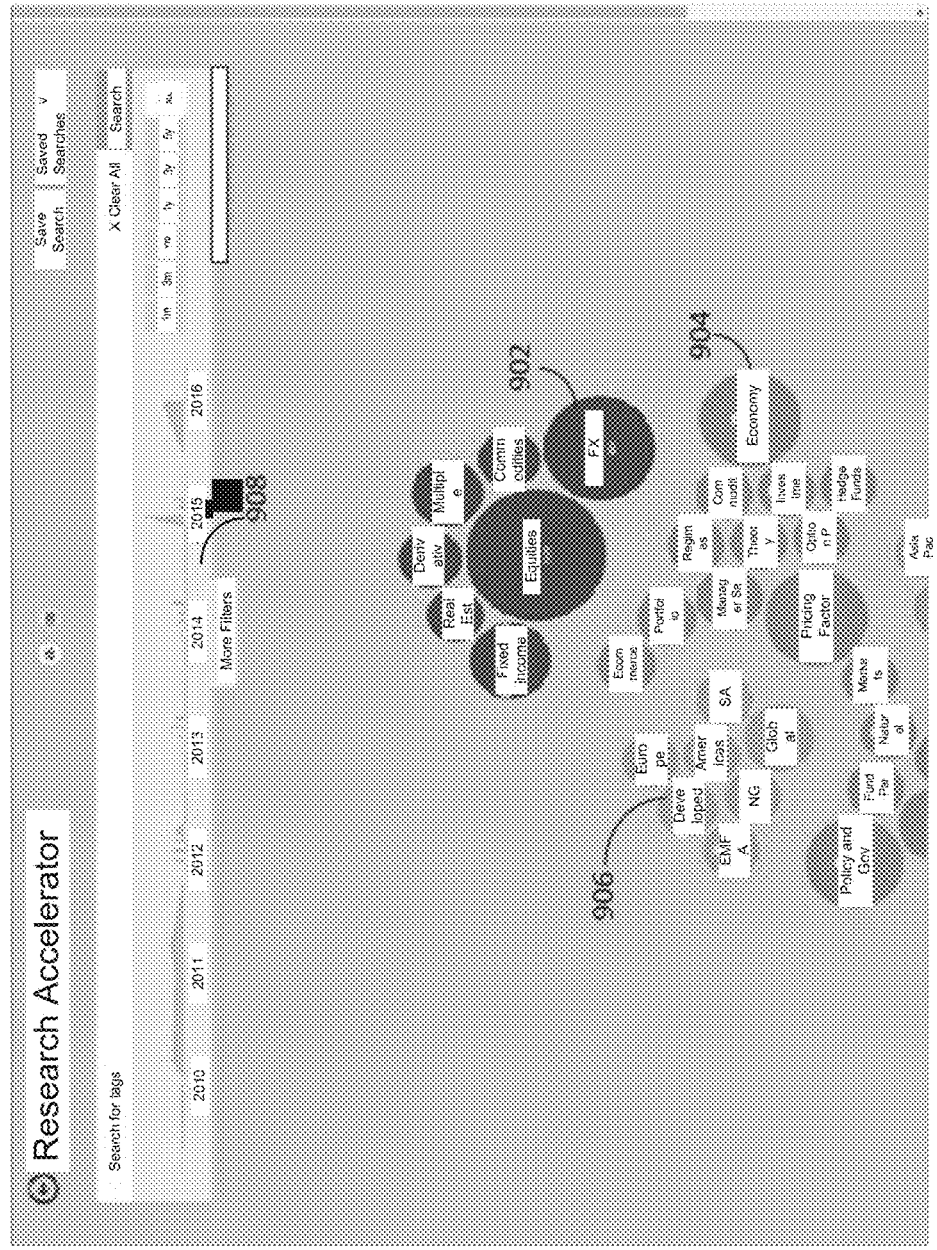

FIG. 9A illustrates a user interface 900 according to an embodiment. The user interface elements shown within FIG. 9A may be configured to operate consistent with the description of user interface elements described with respect to FIGS. 7A-E and FIGS. 8A-E, for example. As illustrated within FIG. 9A, user interface elements 902, 904, and 906 may be represented as circles of various sizes and colors. The color of each user interface element may represent a type of field associated with the user interface element. By way of example, and not limitation, user interface element 902 may be of a first color and associated with a first field type. User interface element 904 may be of a second color and associated with a second field type. User interface element 906 may be of a third color and associated with a third field type. It can be appreciated that, while differing color may be used to indicate different types of fields, such as geographic fields or classes of assets, other ways may be employed. For example, different shapes, sizes, fonts, or other design techniques may be employed to indicate different field types.

In addition to indicating a type of field, each user interface element 902, 904, and 906 may also indicate a label for a tag associated with a database record and a numerical indication of a number of records within a database associated with the tag. In an example, user interface element 902 indicates that 666 records are associated with the FX tag, user interface element 904 indicates that 538 records are associated with the Economy tag, and user interface element 906 indicates that 36 elements are associated with the Developed tag. As shown within FIG. 9A, user interface elements may be of a size that is in general relation to the number of records indicated. As an example, user interface element 902 may appear larger than user interface element 906 because it is associated with a larger number of database records.

FIG. 9A also includes a user interface element 908, which may be a timeline. The timeline of user interface element 908 may indicate a volume of database records associated with a current selection of user interface elements associated with tags. For example, since no user interface elements have been selected in FIG. 9A, user interface element 908 may indicate the volume of all records within a database over time. When a selection is made, as will be discussed herein, the timeline may dynamically and automatically be update to reflect the volume of records associated with the results of a database query, which may be automatically generated based upon manipulation of user interface elements within user interface 900.

Figure 9B:
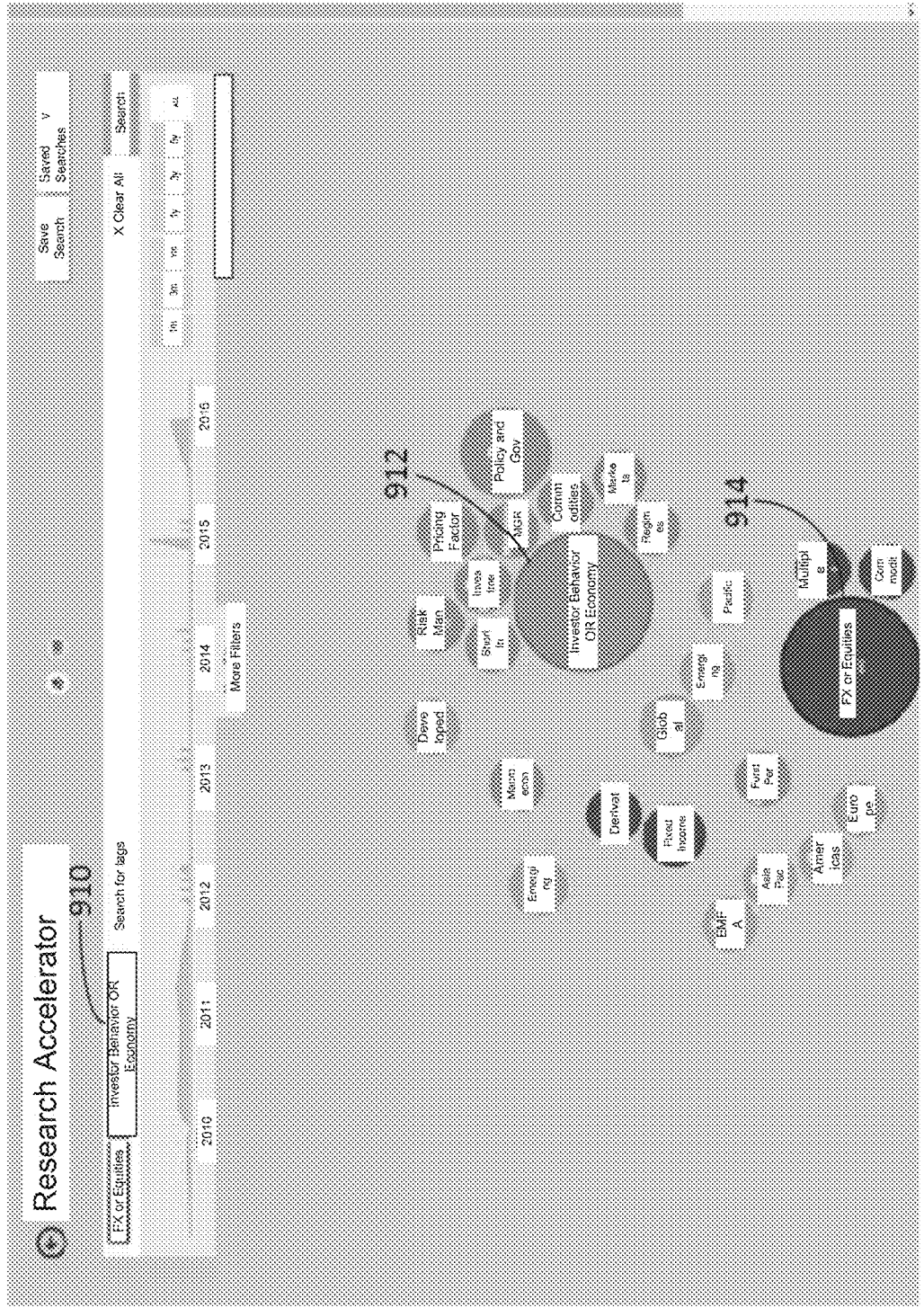

FIG. 9B illustrates user interface 900 in a selection state. As shown, user interface elements 912 and 914 have been highlighted, indicating that they have been selected by a user using an input device of a client device. For purposes of illustration, highlighting the outer portion of user interface elements 912 and 914 is shown, however, other indications of selection may be used. By way of example and not limitation, selection may be shown using highlighting, animation, change in size, and/or change in color.

As shown in FIG. 9B, user interface elements 912 and 914 have been selected and highlighted to indicate selection. When selected in this manner, i.e., selected independently from one another, it may indicate that a particular type of query should be generated. In one example, separately selecting multiple user interface elements may indicate that an AND operation should be generated. In other embodiments, selecting multiple user interface elements independently may indicate an OR operation. Further, the user may be presented with options with respect to the automated generation of database queries, and may be able to choose the type of query that should be generated in response to a particular selection of user interface elements.

In this example, selection of user interface elements 912 and 914 may automatically generate a query "SELECT * FROM DB WHERE FIELD1='Investor Behavior OR Economy' AND FIELD2='FX OR Equities'". Consistent with the descriptions within FIGS. 7A-E and FIGS. 8A-E above, user interface elements 912 and 914 may have been previously generated by dragging a first user interface element onto another user interface element into a combined user interface element. This may also have generated a corresponding database query consisting of an OR operation for the combined tags. In this manner, complex queries may be generated by users of user interface 900 by manipulating user interface elements. The response to the query may be sent from a query module to the GUI module. The GUI module may then configure the display of the user interface 900 accordingly. In the example illustrated within FIG. 9B, the counts within all displayed user interface elements may be updated to represent the number of data records within the database that are tagged with the selected tags.

FIG. 9B may include user interface elements 910, which may be configured by a GUI module to display the tags which have been selected by a user. User interface elements 910 may be displayed in a corresponding color to the selected user interface elements, may display tag names, and may be deleted by a user of user interface 900 to deselect the user interface elements. Deselection of a user interface element 910 may trigger an updated query of a database and updated configuration of user interface 900 by one or more of the modules described herein.

Figure 9C:
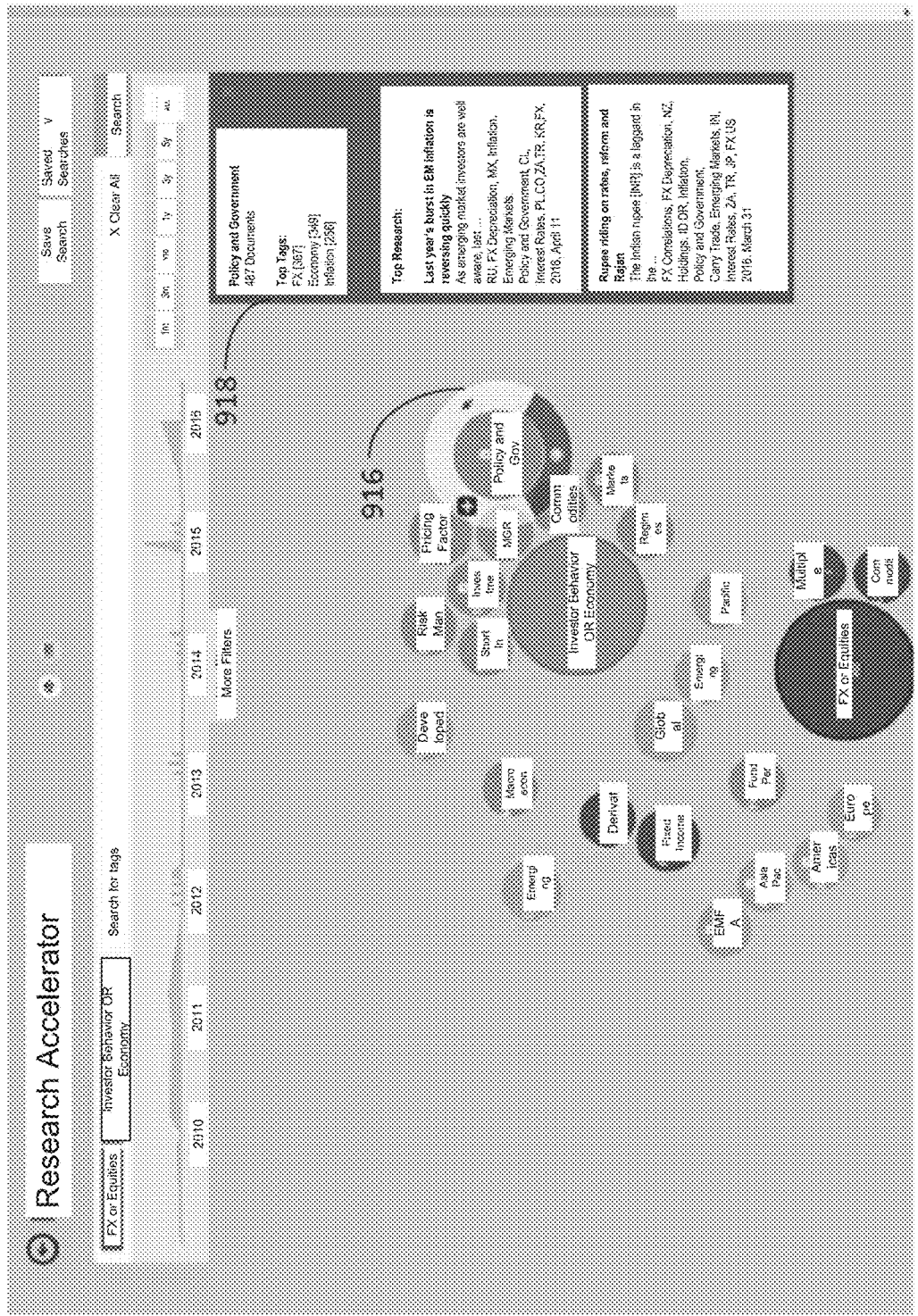

FIG. 9C illustrates user interface 900 in a selection state similar to that described with respect to FIG. 9B. FIG. 9C includes user interface elements 916 and 918, which may be displayed in response to selection of, or hovering over, a user interface elements associated with a tag. In an example, selecting or hovering over the Policy and Government tag may trigger display of user interface element 916. User interface element 916 may consist of one or more buttons, which may allow a user to select, deselect, or view more information with respect an associated tag. Of course, other user interface elements may be displayed based on various design considerations. User interface element 918 may be generated based upon a selection or hovering over of a tag. User interface element 918 may display information concerning a tag, such as a number of records within a database associated with a tag, a number of other tags also associated with those records, recent research associated with the tags, and so on.

Figure 9D:
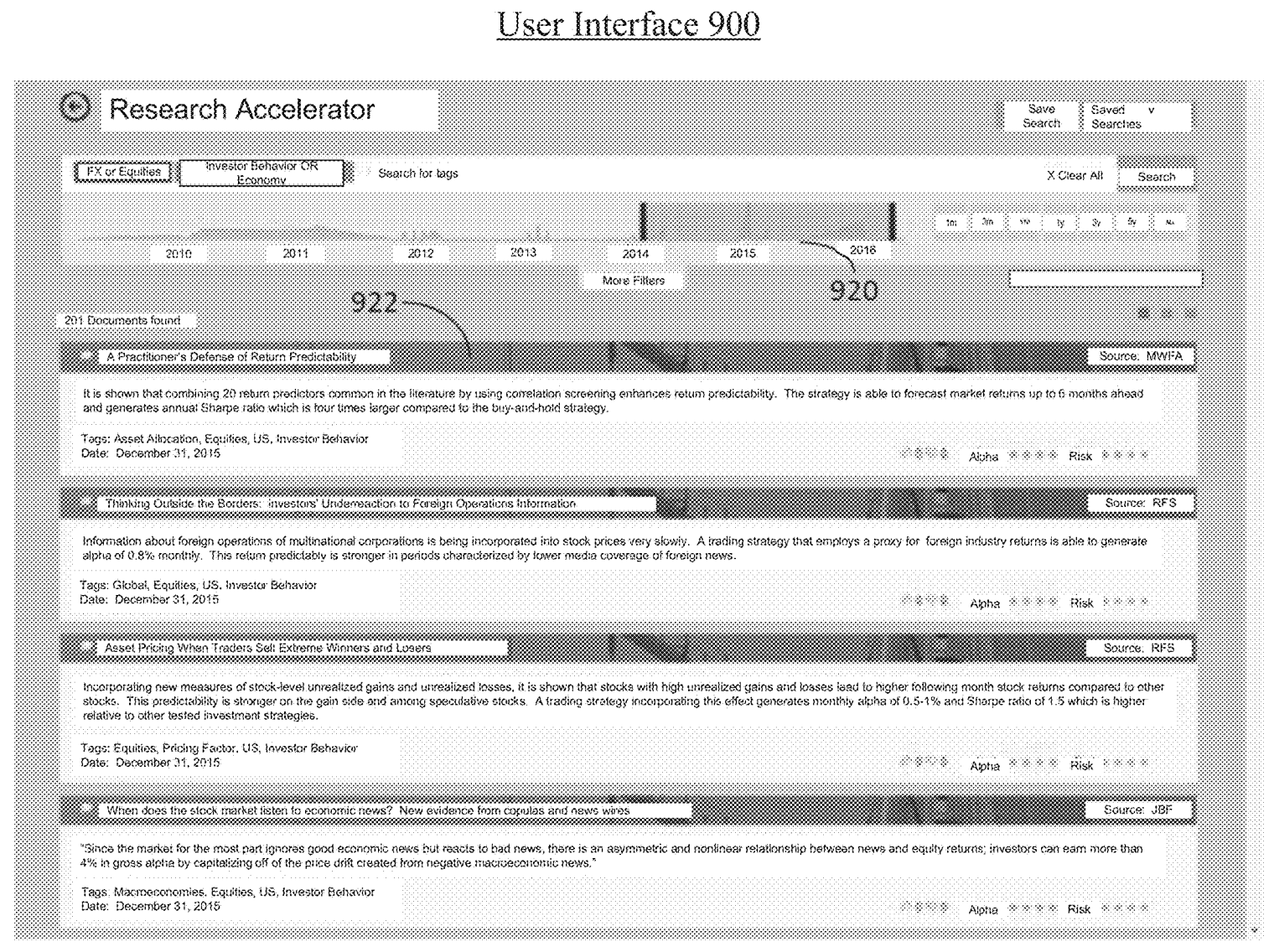

FIG. 9D illustrates a document viewing portion of user interface 900. Once a selection of user interface elements has been made, or when none have been selected and an entire database may be viewed, a user may select a document viewing portion of user interface 900. As illustrated, the document viewing portion of user interface 900 may include user interface elements 920 and 922. User interface element 920 may server to limit a date range within a timeline of records associated with user selected tags. User interface 920 may include a date range that may be dragged and resized based upon user input. As a user adjusts an applicable date range, updated queries to the database may be automatically generated to limit result to the selected range of dates. In this manner, a user may not only select certain tags or combinations of tags, but may queries a database based upon certain dates using user interface 900. In the illustrated example, a range between 2014 and 2016 has been selected. User interface element 922 may include a listing of data records that may be displayed to a user based upon selection of user interface elements and a data range 920. Each listing within user interface element 922 may include information about a database record including, but not limited to, a title, abstract, associated tags, date, and ranking information.

Figure 10:
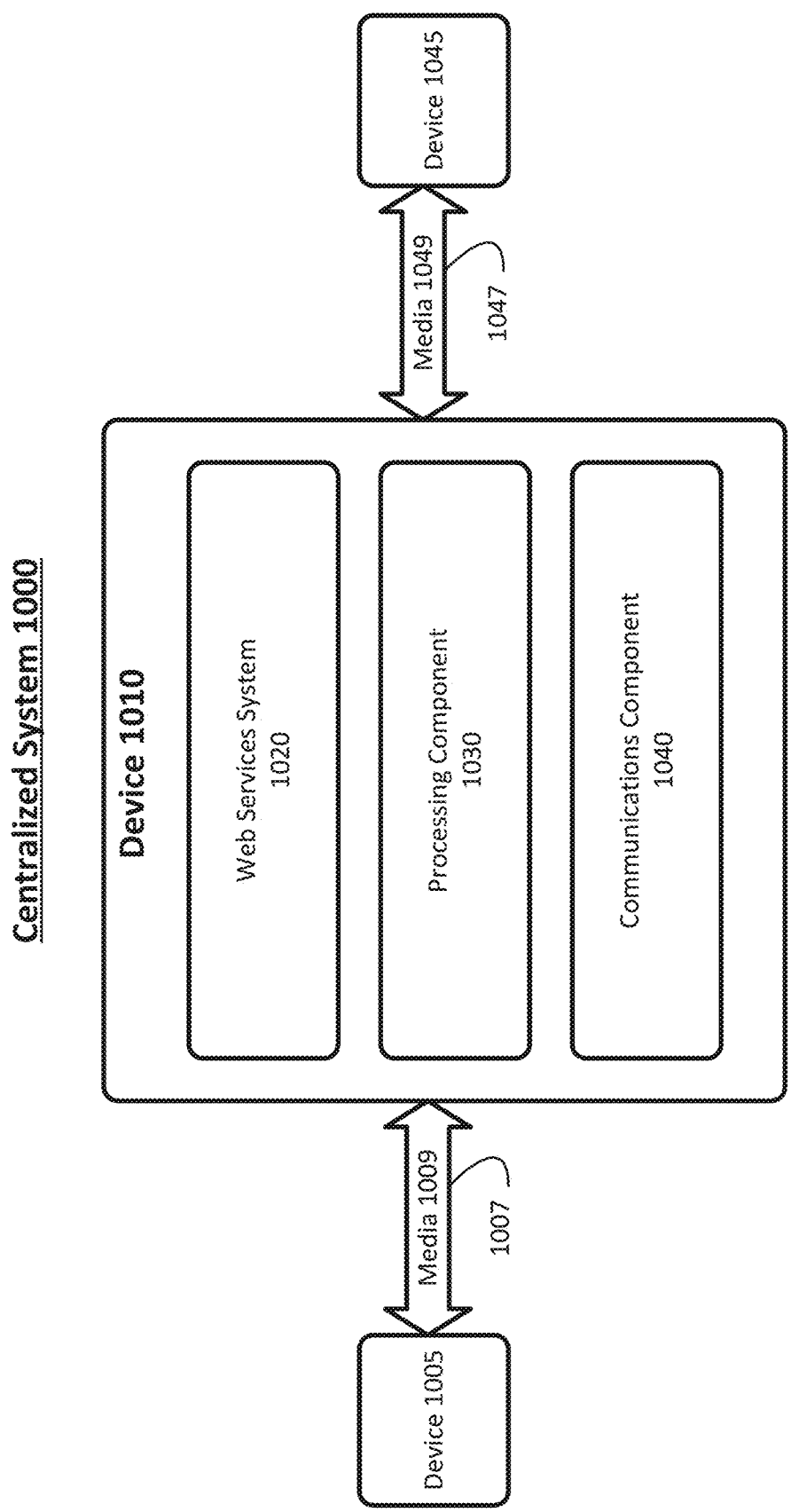
FIG. 10 illustrates an embodiment of a centralized system according to an embodiment.

FIG. 10 illustrates a block diagram of a centralized system 1000. The centralized system 1000 may implement some or all of the structure and/or operations for the web services system 1020 in a single computing entity, such as entirely within a single device 1010.

The device 1010 may comprise any electronic device capable of receiving, processing, and sending information for the web services system 1020. Examples of an electronic device may include without limitation a computer, a personal computer (PC), a desktop computer, a laptop computer, a notebook computer, a netbook computer, a handheld computer, a tablet computer, a server, a server array or server farm, a web server, a network server, an Internet server, a work station, a main frame computer, a supercomputer, a network appliance, a web appliance, a distributed computing system, multiprocessor systems, processor-based systems, wireless access point, base station, subscriber station, radio network controller, router, hub, gateway, bridge, switch, machine, or any variation or combination thereof. The embodiments are not limited in this context.

The device 1010 may execute processing operations or logic for the web services system 1020 using a processing component 1030. The processing component 1030 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1010 may execute communications operations or logic for the web services system 1020 using communications component 1040. The communications component 1040 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1040 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1009, 1049 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1010 may communicate with other devices 1005, 1045 over a communications media 1009, 1049, respectively, using communications signals 1007, 1047, respectively, via the communications component 1040. The devices 1005, 1045, may be internal or external to the device 1010 as desired for a given implementation. Examples of devices 1005, 1045 may include, but are not limited to, a mobile device, a personal digital assistant (PDA), a mobile computing device, a smart phone, a telephone, a digital telephone, a cellular telephone, ebook readers, a handset, a one-way pager, a two-way pager, a messaging device, consumer electronics, programmable consumer electronics, game devices, television, digital television, or set top box.

For example, device 1005 may correspond to a client device such as a phone used by a user. Signals 1007 sent over media 1009 may therefore comprise communication between the phone and the web services system 1020 in which the phone transmits a request and receives a web page in response.

Device 1045 may correspond to a second user device used by a different user from the first user, described above. In one embodiment, device 1045 may submit information to the web services system 1020 using signals 1047 sent over media 1049 to construct an invitation to the first user to join the services offered by web services system 1020. For example, if web services system 1020 comprises a social networking service, the information sent as signals 1047 may include a name and contact information for the first user, the contact information including phone number or other information used later by the web services system 1020 to recognize an incoming request from the user. In other embodiments, device 1045 may correspond to a device used by a different user that is a friend of the first user on a social networking service, the signals 1047 including status information, news, images, or other social-networking information that is eventually transmitted to device 1005 for viewing by the first user as part of the social networking functionality of the web services system 1020.

Figure 11:
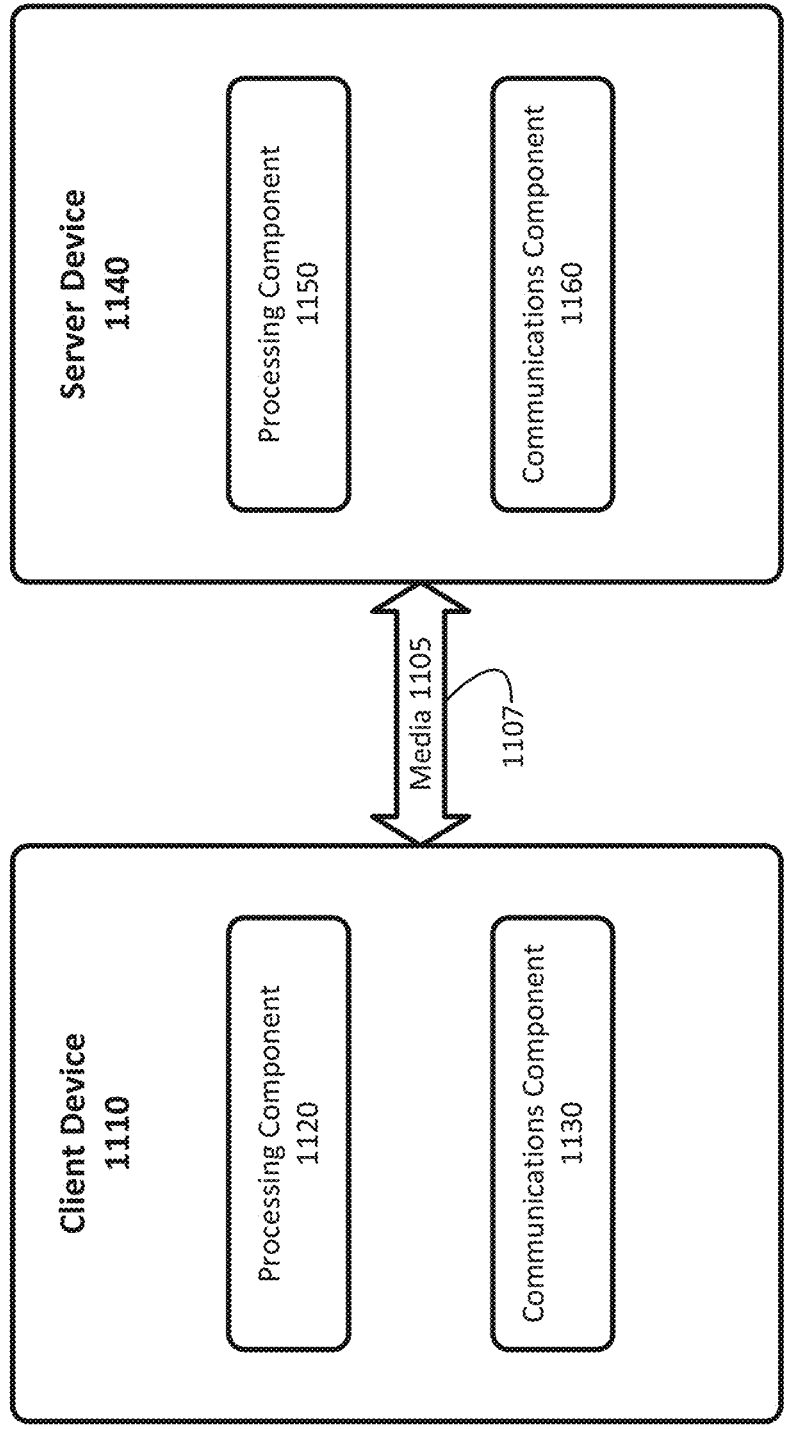
FIG. 11 illustrates an embodiment of a distributed system according to an embodiment.

FIG. 11 illustrates a block diagram of a distributed system 1100. The distributed system 1100 may distribute portions of the structure and/or operations for the disclosed embodiments across multiple computing entities. Examples of distributed system 1100 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1100 may comprise a client device 1110 and a server device 1140. In general, the client device 1110 and the server device 1140 may be the same or similar to device 1010 as described with reference to FIG. 10. For instance, the client device 1110 and the server device 1140 may each comprise a processing component 1120, 1150 and a communications component 1130, 1160 which are the same or similar to the processing component 1030 and the communications component 1040, respectively, as described with reference to FIG. 10. In another example, the devices 1110 and 1140 may communicate over a communications media 1105 using media 1105 via signals 1107.

The client device 1110 may comprise or employ one or more client programs that operate to perform various methodologies in accordance with the described embodiments. In one embodiment, for example, the client device 1110 may implement some steps described with respect client devices described in the preceding figures.

Figure 12:
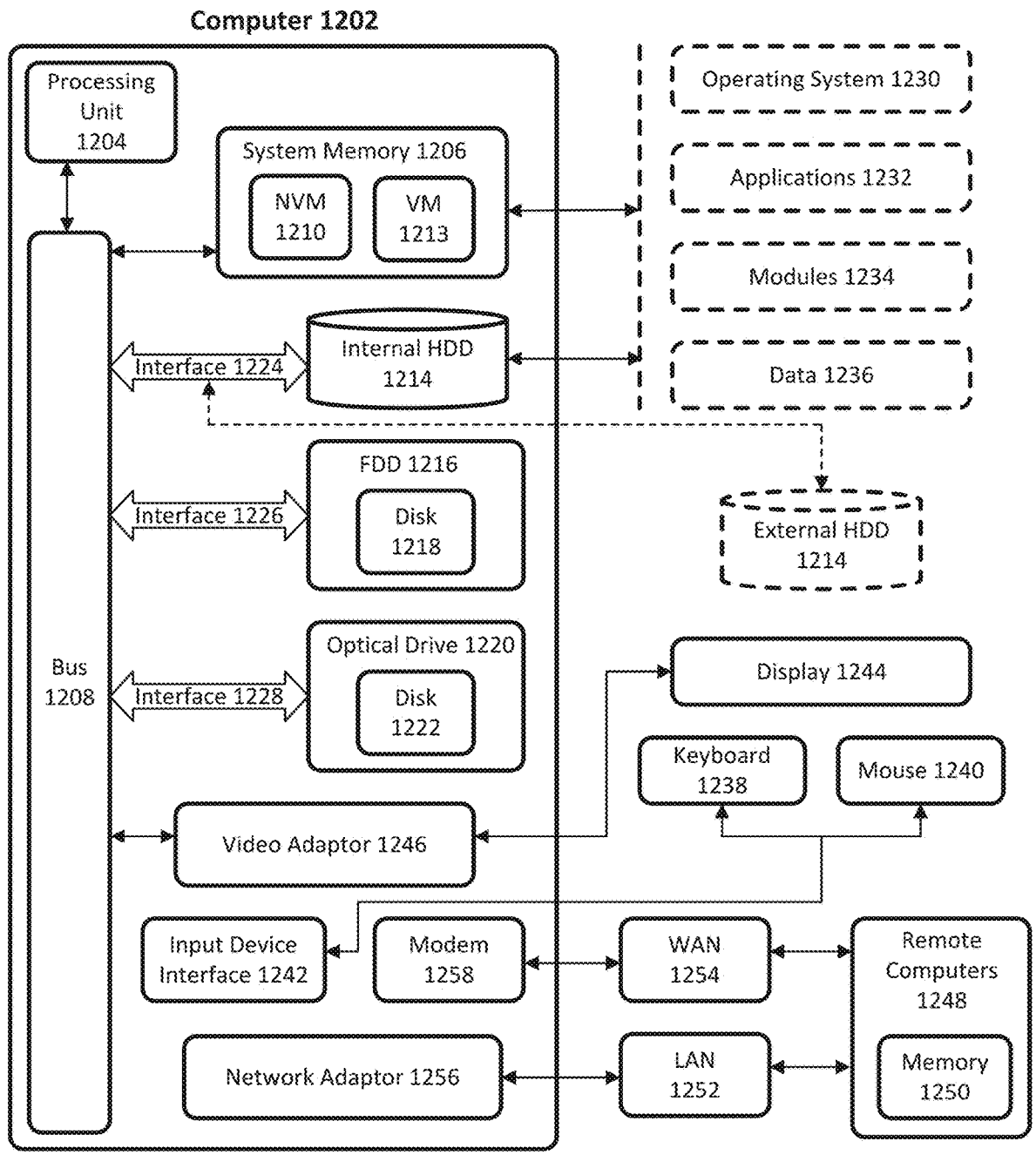
FIG. 12 illustrates an embodiment of a computing architecture.

The server device 1140 may comprise or employ one or more server programs that operate to perform various methodologies in accordance with the described embodiments. In one embodiment, for example, the server device 1140 may implement some steps described with respect to server devices described in the preceding figures FIG. 12 illustrates an embodiment of an exemplary computing architecture 1200 suitable for implementing various embodiments as previously described. In one embodiment, the computing architecture 1200 may comprise or be implemented as part of an electronic device. Examples of an electronic device may include those described herein. The embodiments are not limited in this context.

As used in this application, the terms "system" and "component" are intended to refer to a computer-related entity, either hardware, a combination of hardware and software, software, or software in execution, examples of which are provided by the exemplary computing architecture 1200. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1200 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1200.

As shown in FIG. 12, the computing architecture 1200 comprises a processing unit 1204, a system memory 1206 and a system bus 1208. The processing unit 1204 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1204.

The system bus 1208 provides an interface for system components including, but not limited to, the system memory 1206 to the processing unit 1204. The system bus 1208 can be any of several types of bus structure that may further interconnect to a memory bus (with or without a memory controller), a peripheral bus, and a local bus using any of a variety of commercially available bus architectures. Interface adapters may connect to the system bus 1208 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1200 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1206 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 12, the system memory 1206 can include non-volatile memory 1210 and/or volatile memory 1213. A basic input/output system (BIOS) can be stored in the non-volatile memory 1210.

The computer 1202 may include various types of computer-readable storage media in the form of one or more lower speed memory units, including an internal (or external) hard disk drive (HDD) 1214, a magnetic floppy disk drive (FDD) 1216 to read from or write to a removable magnetic disk 1218, and an optical disk drive 1220 to read from or write to a removable optical disk 1222 (e.g., a CD-ROM, DVD, or Blu-ray). The HDD 1214, FDD 1216 and optical disk drive 1220 can be connected to the system bus 1208 by a HDD interface 1224, an FDD interface 1226 and an optical drive interface 1228, respectively. The HDD interface 1224 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1210, 1213, including an operating system 1230, one or more application programs 1232, other program modules 1234, and program data 1236. In one embodiment, the one or more application programs 1232, other program modules 1234, and program data 1236 can include, for example, the various applications and/or components to implement the disclosed embodiments.

A user can enter commands and information into the computer 1202 through one or more wire/wireless input devices, for example, a keyboard 1238 and a pointing device, such as a mouse 1240. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1204 through an input device interface 1242 that is coupled to the system bus 1208, but can be connected by other interfaces such as a parallel port, IEEE 1394 serial port, a game port, a USB port, an IR interface, and so forth.

A display 1244 is also connected to the system bus 1208 via an interface, such as a video adaptor 1246. The display 1244 may be internal or external to the computer 1202. In addition to the display 1244, a computer typically includes other peripheral output devices, such as speakers, printers, and so forth.

The computer 1202 may operate in a networked environment using logical connections via wire and/or wireless communications to one or more remote computers, such as a remote computer 1248. The remote computer 1248 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1250 is illustrated. The logical connections depicted include wire/wireless connectivity to a local area network (LAN) 1252 and/or larger networks, for example, a wide area network (WAN) 1254. Such LAN and WAN networking environments are commonplace in offices and companies, and facilitate enterprise-wide computer networks, such as intranets, all of which may connect to a global communications network, for example, the Internet.

When used in a LAN networking environment, the computer 1202 is connected to the LAN 1252 through a wire and/or wireless communication network interface or adaptor 1256. The adaptor 1256 can facilitate wire and/or wireless communications to the LAN 1252, which may also include a wireless access point disposed thereon for communicating with the wireless functionality of the adaptor 1256.

When used in a WAN networking environment, the computer 1202 can include a modem 1258, or is connected to a communications server on the WAN 1254, or has other means for establishing communications over the WAN 1254, such as by way of the Internet. The modem 1258, which can be internal or external and a wire and/or wireless device, connects to the system bus 1208 via the input device interface 1242. In a networked environment, program modules depicted relative to the computer 1202, or portions thereof, can be stored in the remote memory/storage device 1250. It will be appreciated that the network connections shown are exemplary and other means of establishing a communications link between the computers can be used.

The computer 1202 is operable to communicate with wire and wireless devices or entities using the IEEE 802 family of standards, such as wireless devices operatively disposed in wireless communication (e.g., IEEE 802.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 13:
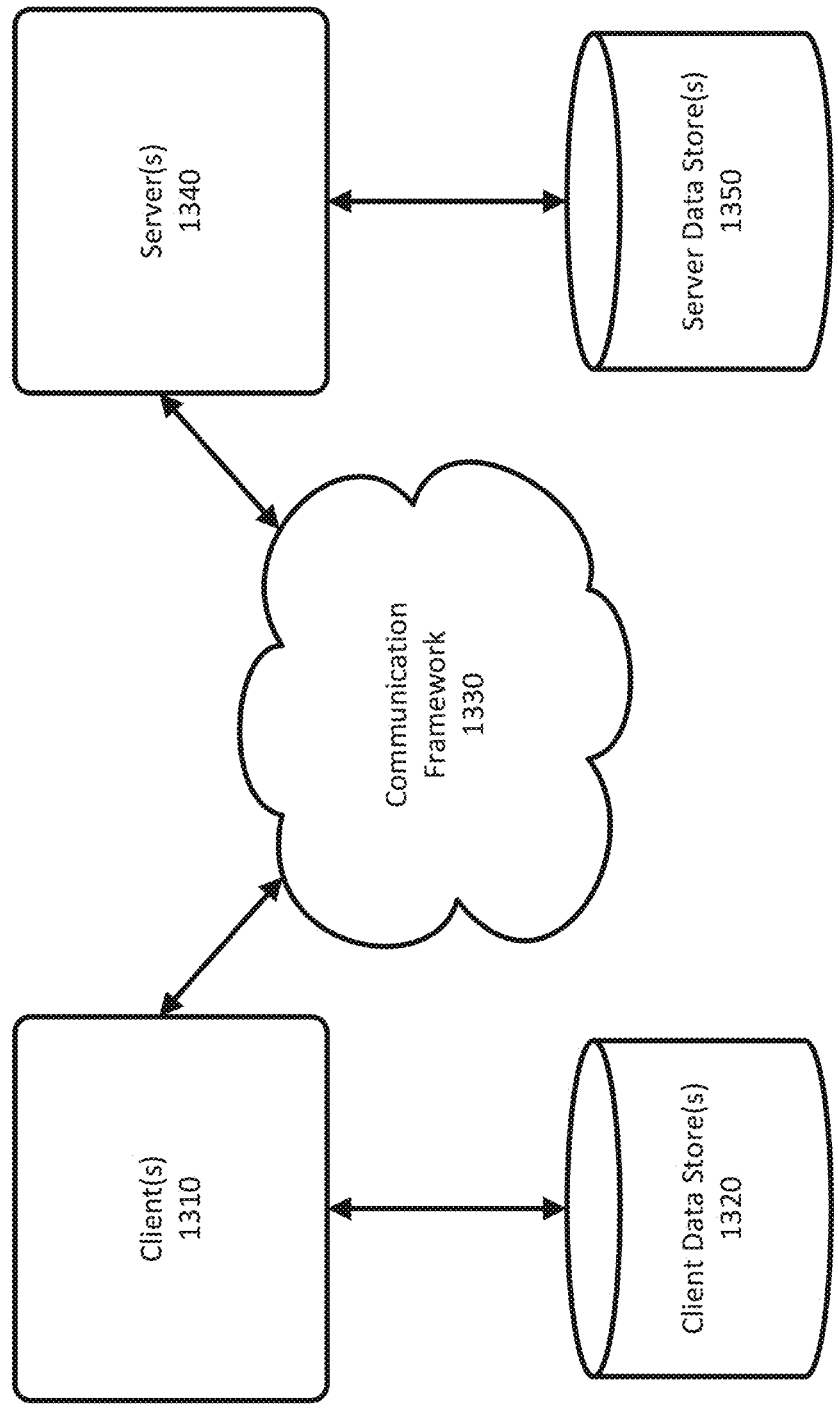
FIG. 13 illustrates an embodiment of a communications architecture.

FIG. 13 illustrates a block diagram of an exemplary communications architecture 1300 suitable for implementing various embodiments as previously described. The communications architecture 1300 includes various common communications elements, such as a transmitter, receiver, transceiver, radio, network interface, baseband processor, antenna, amplifiers, filters, power supplies, and so forth. The embodiments, however, are not limited to implementation by the communications architecture 1300.

As shown in FIG. 13, the communications architecture 1300 comprises includes one or more clients 1310 and servers 1340. The clients 1310 may implement the client device 1110, for example. The servers 1340 may implement the server device 1140, for example. The clients 1310 and the servers 1340 are operatively connected to one or more respective client data stores 1320 and server data stores 1350 that can be employed to store information local to the respective clients 1310 and servers 1340, such as cookies and/or associated contextual information.

The clients 1310 and the servers 1340 may communicate information between each other using a communication framework 1330. The communications framework 1330 may implement any well-known communications techniques and protocols. The communications framework 1330 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1330 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1310 and the servers 1340. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible.

The invention claimed is:

1. A computer-implemented method, comprising:

configuring, with the processor of a server computing device, the display of one or more user interface elements in a graphical user interface, wherein the one or more user interface elements represent records stored within a first database stored on a non-transitory computer-readable storage medium of the server computing device, wherein the configuring comprises accessing a data record for a tag in a tag database to determine whether a user interface element associated with a selected tag is to be displayed or not and wherein the tag is a label for categorizing data records within the first database;

communicating the graphical user interface as configured from the server computing device to a client computing device;

receiving, at the server computing device from the client computing device, an input received by the graphical user interface, the input indicating selection of one or more of the user interface elements;

configuring, with the processor of the server computing device, an indication within the graphical user interface that the one or more of the user interface elements has been selected;

automatically generating, by the processor of the server computing device, one or more queries to the first database based upon the received input;

automatically updating, by the processor of the server computing device, the configuration of the display of the one or more user interface elements of the graphical user interface based upon a result of the automatically generated one or more queries to the first database, the one or more queries to trigger an addition of a new user interface element to the configuration of the display, the new user interface element associated with a previously hidden tag associated with the one or more user interface elements selected via the input; and communicating the updated configuration of the display of the one or more user interface elements of the graphical user interface from the server computing device to the client computing device for display on a display device of the client computing device.

2. The computer-implemented method of claim 1, wherein the received input from the graphical user interface represents the separate selection of two or more of the user interface elements.

3. The computer-implemented method of claim 2, wherein the automatically generated one or more queries includes an AND operation.

4. The computer-implemented method of claim 1, wherein the received input from the graphical user interface represents the click and drag of at least one of the user interface elements onto another of the one or more user interface elements.

5. The computer-implemented method of claim 4, wherein the automatically generated one or more queries includes an OR operation.

6. The computer-implemented method of claim 1, wherein the automatic update, by the processor of the server, of the configuration of the display of the one or more user interface elements based upon a result of the automatically generated one or more queries to the first database further includes:
  determining, by the processor of the server computing device, one or more new user interface elements to display on the graphical user interface; and
  configuring, by the processor of the server computing device, the display of the one or more new user interface elements as part of the graphical user interface.

7. The computer-implemented method of claim 1, wherein the indication within the graphical user interface that the one or more of the user interface elements has been selected includes a graphical timeline representing a volume of results to the automatically generated one or more queries.

8. The computer-implemented method of claim 1, wherein the indication within the graphical user interface that the one or more of the user interface elements has been selected includes a modification of one of the selected one or more user interface elements to include a graphical user interface menu.

9. A computing system, comprising:
  a server computing device including a processor to:
  configure the display of one or more user interface elements in a graphical user interface, the one or more user interface elements representing records stored within a first database stored on a non-transitory computer-readable storage medium of the server computing device, wherein the configuring comprises accessing a data record for a tag in a tag database to determine whether a user interface element associated with a selected tag is to be displayed or not and wherein the tag is a label for categorizing data records within the first database;
  communicate the graphical user interface as configured from the server computing device to a client computing device;
  receive an input received by the a graphical user interface, the input indicating selection of one or more of the user interface elements;
  configure an indication within the graphical user interface that the one or more of the user interface elements has been selected;
  automatically generate one or more queries to the first database based upon the received input;
  automatically update the configuration of the display of the one or more user interface elements based upon a result of the automatically generated one or more queries to the first database, the one or more queries to trigger an addition of a new user interface element to the configuration of the display, the new user interface element associated with a previously hidden tag associated with the one or more user interface elements selected via the input; and
  communicate the updated configuration of the display of the one or more user interface elements of the graphical user interface from the server computing device to the client computing device for display on a display device of the client computing device.

10. The system of claim 9, wherein the received input from the graphical user interface represents the separate selection of two or more of the user interface elements.

11. The system of claim 10, wherein the automatically generated one or more queries includes an AND operation.

12. The system of claim 1, wherein the received input from the graphical user interface represents the click and drag of at least one of the user interface elements onto another user interface element of the at least one user interface elements.

13. The system of claim 12, wherein the automatically generated one or more queries includes an OR operation.

14. The system of claim 9, wherein the automatic update of the configuration of the display of the one or more user interface elements based upon a result of the automatically generated one or more queries to the first database further includes:
  determining one or more new user interface elements to display on the graphical user interface; and
  configuring the display of the one or more new user interface elements as part of the graphical user interface.

15. The system of claim 9, wherein the indication within the graphical user interface that the one or more of the user interface elements has been selected includes a graphical timeline representing a volume of results to the automatically generated one or more queries.

16. The system of claim 9, wherein the indication within the graphical user interface that the one or more of the user interface elements has been selected includes a modification of at least one of the selected one or more user interface elements to include a graphical user interface menu.

17. An article including a computer-readable storage medium including instructions, that, when executed by a processor of a server computing device, cause the processor to:
  configure the display of one or more user interface elements in a graphical user interface, the one or more user interface elements representing records stored within a first database stored on a non-transitory computer-readable storage medium of the server computing device, wherein the configuring comprises accessing a data record for a tag in a tag database to determine whether a user interface element associated with a selected tag is to be displayed or not and wherein the tag is a label for categorizing data records within the first database;
  communicate the graphical user interface as configured from the server computing device to a client computing device;
  receive an input received by the graphical user interface, the input indicating selection of one or more of the user interface elements;

configure an indication within the graphical user interface that the one or more of the user interface elements has been selected;

automatically generate one or more queries to the first database based upon the received input; and automatically update the configuration of the display of the one or more user interface elements of the graphical user interface based upon a result of the automatically generated one or more queries to the first database, the one or more queries to trigger an addition of a new user interface element to the configuration of the display, the new user interface element associated with a previously hidden tag associated with the one or more user interface elements selected via the input; and communicate the updated configuration of the display of the one or more user interface elements of the graphical user interface from the server computing device to the client computing device for display on a display device of the client computing device.

18. The article of claim 17, wherein the received input from the graphical user interface represents the separate selection of two or more of the user interface elements.

19. The article of claim 18, wherein the automatically generated one or more queries includes an AND operation.

20. The article of claim 17, wherein the received input from the graphical user interface represents the click and drag of at least one of the user interface elements onto another user interface element of the at least one user interface elements.

21. The article of claim 20, wherein the automatically generated one or more queries includes an OR operation.

22. The article of claim 17, wherein the automatic update, by the processor of the server, of the configuration of the display of the one or more user interface elements based upon a result of the automatically generated one or more queries to the first database further includes:

determining one or more new user interface elements to display on the graphical user interface; and configuring the display of the one or more new user interface elements as part of the graphical user interface.

23. The article of claim 17, wherein the indication within the graphical user interface that the one or more of the user interface elements has been selected includes a graphical timeline representing a volume of results to the automatically generated one or more queries.

24. The article of claim 17, wherein the indication within the graphical user interface that the one or more of the user interface elements has been selected includes a modification of at least one of the selected one or more user interface elements to include a graphical user interface menu.

* * * * *